(12) United States Patent
Salvador et al.

(10) Patent No.: US 10,855,974 B2
(45) Date of Patent: Dec. 1, 2020

(54) METHODS AND APPARATUS FOR RADIAL AUTOMULTISCOPIC DISPLAY

(71) Applicant: Massachusetts Institute of Technology, Cambridge, MA (US)

(72) Inventors: Emily Salvador, Cambridge, MA (US); Emily Van Belleghem, Los Gatos, CA (US); Daniel Novy, Cambridge, MA (US); Victor Michael Bove, Jr., Wrentham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 77 days.

(21) Appl. No.: 16/250,088

(22) Filed: Jan. 17, 2019

(65) Prior Publication Data

US 2019/0222828 A1    Jul. 18, 2019

Related U.S. Application Data

(60) Provisional application No. 62/618,580, filed on Jan. 17, 2018.

(51) Int. Cl.
*H04N 13/305* (2018.01)
*H04N 13/398* (2018.01)
(Continued)

(52) U.S. Cl.
CPC ........... *H04N 13/305* (2018.05); *G02B 30/27* (2020.01); *H04N 13/351* (2018.05); *H04N 13/368* (2018.05); *H04N 13/398* (2018.05)

(58) Field of Classification Search
None
See application file for complete search history.

(56) References Cited

U.S. PATENT DOCUMENTS 1,772,782 A    8/1930   Noaillon
1,849,036 A    3/1932   Ernst
(Continued)

FOREIGN PATENT DOCUMENTS

EP    1465126 A2    10/2004

OTHER PUBLICATIONS

Blundell, B., On Aspects of Glasses-Free 3D Cinema~70 Years Ago; published Sep. 2013.
(Continued)

*Primary Examiner* — Lindsay J Uhl
(74) *Attorney, Agent, or Firm* — Stephen R. Otis

(57) ABSTRACT

A display system may comprise a radially symmetric mirror, a display screen, and a radial array of lenticular lenses. The mirror may be a frustum of a cone. Light from the screen may pass through the radial array and then reflect from the mirror, to create a 360-degree automultiscopic display. The automultiscopic display may display multiple rendered views of a 3D scene, each of which shows the scene from a different virtual camera angle. Which rendered view is visible may depend on the angular position of a user. Each lenticular lens may be wedge-shaped and may have a constant focal length and a constant height-width ratio. In some cases, slices from some, but not all, of the rendered views are displayed under any single lenticular lens at a given time. The lenticular array may be replaced by a holographic optical element, or by radial array of parallax barriers.

19 Claims, 12 Drawing Sheets

(51) Int. Cl.
*H04N 13/368* (2018.01)
*H04N 13/351* (2018.01)
*G02B 30/27* (2020.01)

(56) References Cited

U.S. PATENT DOCUMENTS

| | | |
|---|---|---|
| 2,441,674 A | 5/1948 | Savoye |
| 9,849,399 B2 | 12/2017 | Crowder et al. |
| 2011/0181706 A1 | 7/2011 | Harrold et al. |
| 2011/0211256 A1 | 9/2011 | Connor |
| 2016/0161914 A1* | 6/2016 | Onural ............... H04N 13/257 359/9 |
| 2017/0257622 A1* | 9/2017 | Seifert ............... H04N 13/315 |

OTHER PUBLICATIONS

Jones, A., et al., Rendering for an interactive 360° light field display; published in ACM Transactions on Graphics (TOG), vol. 26, Issue 3, Article No. 40, Jul. 2007.

Lincoln, P., et al., Multi-view lenticular display for group teleconferencing; published in Proceedings of the 2nd International Conference on Immersive Telecommunications, IMMERSCOM '09, Article No. 22, May 2009.

Luo, X., et al., Pepper's Cone: An Inexpensive Do-It-Yourself 3D Display; published in Proceedings of the 30th Annual ACM Symposium on User Interface Software and Technology, UIST '17, pp. 623-633, Oct. 2017.

\* cited by examiner

METHODS AND APPARATUS FOR RADIAL AUTOMULTISCOPIC DISPLAY

RELATED APPLICATIONS

This application claims the benefit of U.S. Provisional Application No. 62/618,580 filed Jan. 17, 2018 (the "Provisional").

FIELD OF TECHNOLOGY

The present invention relates generally to automultiscopic displays.

COMPUTER PROGRAM LISTING

The following nine computer program files are incorporated by reference herein: (1) ColorController_cs.txt with a size of about 1 KB; (2) ComputeLightField_shader.txt with a size of about 4 KB; (3) LightfieldGenerator_cs.txt with a size of about 5 KB; (4) RainbowDebugLenticular_cs.txt with a size of about 3 KB; (5) RotationController_cs.txt with a size of about 1 KB; (6) SceneController_cs.txt with a size of about 2 KB; (7) ToPolarCoords_shader.txt with a size of about 2 KB; (8) ViewGenerator_cs.txt with a size of about 5 KB; and (9) ViewingRadiusDebugger_cs.txt with a size of about 2 KB. Each of these nine files were created as an ASCII .txt file on Dec. 31, 2018.

SUMMARY

In illustrative implementations of this invention, a display device produces an automultiscopic display of a 3D object. The automultiscopic display may comprise a set of multiple images which create an appearance or illusion of a 3D object that is viewable from different angles. In the automultiscopic display, the silhouette of the displayed 3D object (and the portion of the displayed 3D object that is visible to a user) may change (due to horizontal motion parallax) as the user moves around the display device, thereby causing the displayed 3D object to appear as if it occupies a 3D volume.

In some cases, the display device comprises a radially symmetric mirror, an ultra-high-definition (UHD) display screen, and a radial array. The radial array may be a radial array of lenticular lenses. Alternatively, the radial array may be a radial array of parallax barriers.

Light from the display screen may pass through the radial array and then reflect from the radially symmetric mirror, to produce the automultiscopic display.

The mirror may comprise a frustum of a cone or of another radially symmetric shape. The mirror may be located above the radial array of lenticular lenses (or of parallax barriers), which in turn may be above the display screen. The radial axis of the mirror's frustum and the radial axis of the radial array may be spatially co-located. The narrow end of the mirror's frustum may be closer to the radial array than is the wide end of the mirror's frustum. For instance, an inverted frustum of a cone may be located above the center of the radial array.

In some cases, the mirror comprises a beam splitter. The beam splitter may reflect a portion, and transmit a portion, of light incident upon the beam splitter. Thus, in some cases, a user (a) looks through the beam splitter to see a physical object that is actually located on the opposite side of the beam splitter; and (b) at the same time sees an illusion of a 3D object, which illusion is created by rendered views that reflect from the beam splitter. The displayed illusion of the 3D object may appear, to the human user, to be superimposed on the physical object behind the beam splitter.

The display screen may display a radial light pattern beneath the radial array of lenticular lenses (or parallax barriers). Light from this pattern may pass through the radial array and then reflect from the radially symmetric mirror, to create an automultiscopic display.

In some cases, the automultiscopic display is a 360-degree display, and thus is viewable from any horizontal angle (0 degrees to 360 degrees) around the display.

In illustrative implementations, the display device produces an automultiscopic display that displays multiple, discrete, rendered views of a 3D scene. Each of these rendered views may be visible in a different angular region around the display. Thus, as a human user moves around the automultiscopic display, different rendered views (in the display) may become visible to the user.

In illustrative implementations, each of these rendered views shows the 3D scene from a different angle. Put differently, each of these rendered views may show the 3D scene from a different virtual camera angle relative to the 3D scene. For instance: (a) the automultiscopic display may comprise 20 different rendered views of the 3D scene; and (b) the incremental angular change, from one rendered view to the next, may be 18 degrees. For example: (a) a first rendered view may render a 3D object as if it had been captured by a virtual camera located at 0 degrees relative to the 3D object; (b) a second rendered view may render the 3D object as if it had been captured by a virtual camera located at 18 degrees relative to the 3D object; (c) a third rendered view may render the 3D object as if it had been captured by a virtual camera located at 36 degrees relative to the 3D object; and so on.

Which of the multiple rendered views (in the automultiscopic display) is visible to a user may depend on the user's angular position relative to the display. For instance, as a human user moves in a circle around the display device, which rendered view (in the automultiscopic display) is visible to the user may change as the user's angular position relative to the display changes.

Thus, in illustrative implementations, the automultiscopic display exhibits horizontal motion parallax.

However, in some cases, the automultiscopic display does not exhibit binocular parallax, when viewed from at least some angular positions relative to the display. This is because the range of angles (relative to the display) over which a single rendered view is displayed may be greater than the range of angles (relative to the display) between the left and right eyes of a human observer. Thus, in some cases: (a) the display device displays an automultiscopic display of a 3D object; (b) only one specific, rendered view of the 3D object is simultaneously visible to both eyes of a human use, when the user is in certain angular positions relative to the display device, and (c) no other rendered views of the 3D object are visible to either eye of the user, when the user is in those certain angular positions.

As a user moves around the automultiscopic display, the user may encounter transition regions, in which two different rendered views are visible to the user (even if the user subjectively perceives only one view). For instance, a transition region (in which two rendered views are visible) may occur at and near an angular position (relative to the display) that is midway between two adjacent camera angles.

In illustrative implementations, the mirror comprises a reflective or specular material and has a geometric shape that is radially symmetric. For instance, the mirror may comprise the frustum of (a) a cone; (b) an elliptic paraboloid; (c) a sphere; (d) a cylinder; or (e) any other object with at least one axis of rotational symmetry.

In some cases, the radial optical array comprises: (a) a radial array of lenticular lenses; or (b) a radial array of parallax barriers.

In some cases, where a radial array of lenticular lenses is employed, each lenticular lens is wedge-shaped. In the radial array, each lenticular lens may increase in width and height as it radiates outward (as distance from the center of the radial array increases). Each lenticular lens may a constant height-to-width ratio at all points along the length of the lens. Each lenticular lens may have a constant focal length over its entire length. A lenticular lens may focus at the same focal plane at all points along a longitudinal axis of the lens.

In some cases, where a radial array of parallax barriers is employed: (a) each slit in the radial array is wedge-shaped; and (b) each parallax barrier segment (comprising a slit and adjacent opaque barrier) is wedge-shaped. In the radial array, each slit may increase in width as it radiates outward. Likewise, in the radial array, each parallax barrier segment (comprising a slit and adjacent opaque barrier) may increase in width as it radiates outward. Each slit may comprise a hole or aperture (e.g., an elongated hole). Alternatively, each slit may comprise a transparent, solid material. The radial array of parallax barriers may comprise: (a) transparent or void regions that allow light to pass through the array (transmissive regions); and (b) opaque regions that occlude light (opaque regions). The transmissive and opaque regions of the radial array may spatially alternate (e.g., transmissive, opaque, transmissive, opaque, and so on) as angular position relative to the center of the radial array monotonically changes.

In some cases, each rendered view is divided into multiple slices, before being displayed by the display screen. For example, a rendered view may be sliced into vertical strips. For instance, in some cases: (a) a display device creates an automultiscopic display of a 3D object; (b) twenty rendered views of the 3D object are employed in the automultiscopic display; (c) each of the rendered views is divided into 20 slices; and (d) the display screen displays 400 slices (i.e., 20 slices from each of the 20 rendered views) at the same time to create the automultiscopic display.

In some cases, the display screen displays slices of more than one, but not all, of the rendered views under each radial element of the radial array.

For instance, in some cases, (a) a radial array of lenticular lenses is employed; and (b) slices from only a subset of the rendered views are displayed under any single lenticular lens at a given time.

In some cases, even though slices from only a subset of the rendered views are displayed under any specific lenticular lens at a given time, all of the slices of all of the rendered views are displayed under the radial array (taken as a whole) at the given time. This is because different slices may be displayed under different lenticular lenses in the radial array.

In some cases, each of the slices under a particular lenticular lens is from a different rendered view. For instance, in some cases, the display screen displays five slices under a single lenticular lens, where each of the five slices is from a different rendered view.

In some cases, each particular slice of a rendered view is displayed only once at a given time. For example, in some cases: (a) a rendered view is divided into twenty slices; (b) each of the slices is displayed only once at a given time; and (c) all twenty of the slices are displayed at the given time, each under a different lenticular lens.

In some implementations, each rendered view is divided into multiple slices and then each slice is distorted, before being displayed by the display screen. Alternatively, each rendered view may be distorted and then the distorted view may be divided into multiple slices, before being displayed by the display screen.

In some cases, a rectangular slice of a rendered view is distorted into a wedge-shaped slice of the rendered view. The wedge-shaped slice may fit (together with other wedge-shaped slices) under a wedge-shaped lenticular lens of the radial array.

Alternatively, in some cases, a rectangular rendered view is distorted into a wedge-shaped rendered view, which is then divided into wedge-shaped slices. Again, each of the wedge-shaped slices may fit (together with other wedge-shaped slices) under a wedge-shaped lenticular lens of the radial array.

In either approach (slicing and then distorting, or distorting and then slicing) the distortion may be anamorphic.

The preceding ten paragraphs discuss slices of rendered views (and display and distortion of the slices), in the context of a radial array of lenticular lens. In some cases, these ten paragraphs also apply in the context of a radial array of parallax barriers, except that the slices are displayed under slits of the radial array, instead of under lenticular lens.

For instance, in some cases: (a) a radial array of parallax barriers is employed; and (b) slices from more than one, but not all, of the rendered views are displayed under any single slit of the radial array at a given time.

In some cases, the radial array is replaced by a holographic optical element.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

General

Figure 1A:
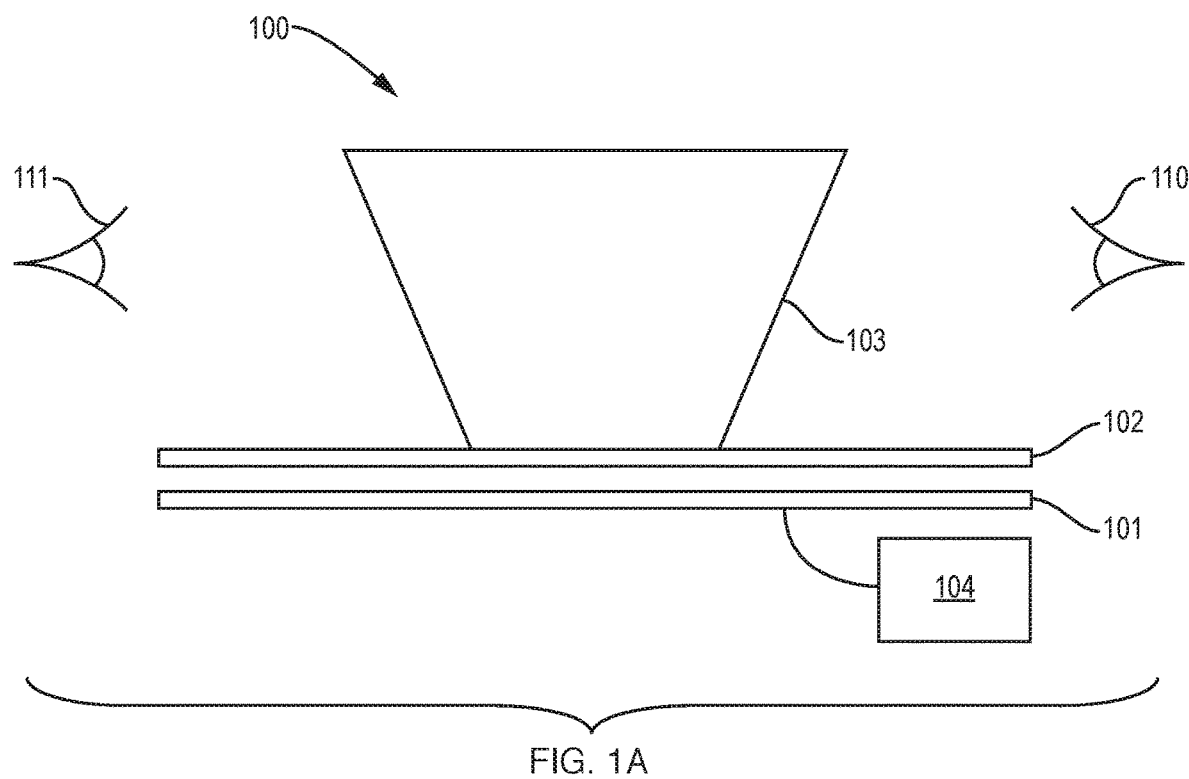
FIG. 1A shows hardware that generates a automultiscopic 360-degree display.

FIG. 1A shows a display device 100 that produces an automultiscopic 360-degree display, in an illustrative implementation of this invention. In FIG. 1A, the automultiscopic display device 100 comprises a display screen 101, a radial optical array 102, a mirrored frustum 103 of a cone (or of another radially symmetric object), and one or more computers 104. Display screen 101 may be controlled by the one or more computers 104. Radial array 102 may be positioned above display screen 101. Radial array 102 may comprise a radial array of lenticular lenses or a radial array of parallax barriers. Light may be emitted by display screen 101, pass through the radial array (of lenticular lenses or parallax barriers), and then reflect from a mirrored surface of a frustum 103 of a cone, creating a 360-degree automultiscopic display of an object.

In FIG. 1A, display device 100 displays an object in such a way that the displayed object appears to viewers to have a 3D volume and to have horizontal motion parallax, even to the naked eyes of a human viewer who is not wearing any "3D glasses". As a human viewer moves horizontally around display device 100, the viewer sees different displayed portions of the 3D object that are displayed by device 100. In FIG. 1A, which displayed portion of the displayed 3D object is seen by a human viewer depends on the horizontal angle from which the viewer looks at the mirrored frustum 103 of display device 100.

In FIG. 1A, display device 100 creates a 360-degree automultiscopic display of an object. This automultiscopic display may be viewed by one or more human users (e.g., 110, 111) from any horizontal viewing angle (out of 360 horizontal degrees) relative to the mirrored frustum 103.

Alternatively, display device 100 may produce an automultiscopic display that is viewable from less than 360 horizontal degrees around display device 100. For instance, in some cases, the total number of horizontal degrees throughout which the automultiscopic display is viewable is: (a) greater than or equal to 90 but less than 120; (b) greater than or equal to 120 but less than 150; (c) greater than or equal to 150 but less than 180; (d) greater than or equal to 180 but less than 210; (e) greater than or equal to 210 but less than 240; (f) greater than or equal to 240 but less than 270; (g) greater than or equal to 270 but less than 300; (h) greater than or equal to 300 but less than 330; or (g) greater than or equal to 330 but less than 350.

In some cases (e.g., in the setup shown in FIG. 1A): (a) a radial axis of symmetry of the radially symmetric mirror is a vertical geometric line; (b) the radial axis of symmetry of the radial array of lenticular lenses (or of parallax barriers) is a vertical geometric line; and (c) the display plane of the display screen is horizontal.

In FIG. 1A, display screen 101 displays slices of multiple views of a 3D object. Light from these displayed slices may pass through radial array 102 (of lenticular lenses or parallax barriers) and then reflect from frustum 103, creating an automultiscopic display of the 3D object.

If radial array 102 comprises a lenticular array, then display screen 101 may, under each lenticular lens in the array, display slices of multiple rendered views of the 3D object. Each rendered view may show the 3D object from a different viewing angle. Which slice (out of the multiple slices displayed under a particular lenticular lens at a given time) is seen by a viewer may depend on the horizontal angle at which the viewer looks at the particular lens (after taking into account optical folding due to reflection from mirrored frustum 103).

Likewise, if radial array 102 comprises an array of parallax barriers, then display screen 101 may, under each slit in the parallax barrier array, display slices of multiple rendered views of the 3D object. Each rendered view may show the 3D object from a different viewing angle. Which slice (out of the multiple slices displayed under a particular slit at a given time) is seen by a viewer may depend on the horizontal angle at which the viewer looks at the particular slit (after taking into account optical folding due to reflection from mirrored frustum 103).

In some cases: (a) radial array 102 comprises an array of lenticular lens; and (b) there is no gap (distance) between radial array 102 and display surface.

In some cases, the display screen (e.g., 101) comprises an ultra-high-definition (UHD) screen. For instance, the UHD screen may comprise an 4K UHD or 8K UHD screen (e.g., a screen that employs a 4K or 8K UHD video format). In some cases, the UHD screen has an aspect ratio of 16:9 or wider, has at least one digital input, and is configured to present native video at a minimum resolution of 3840×2160 pixels. The display screen (e.g., 101) may include, or may be controlled at least in part by, electronic components.

In some cases, radial array 102 instead comprises a holographic optical element (HOE). In some cases, the solid, physical structure of the HOE does not have a radial pattern.

Figure 1B:
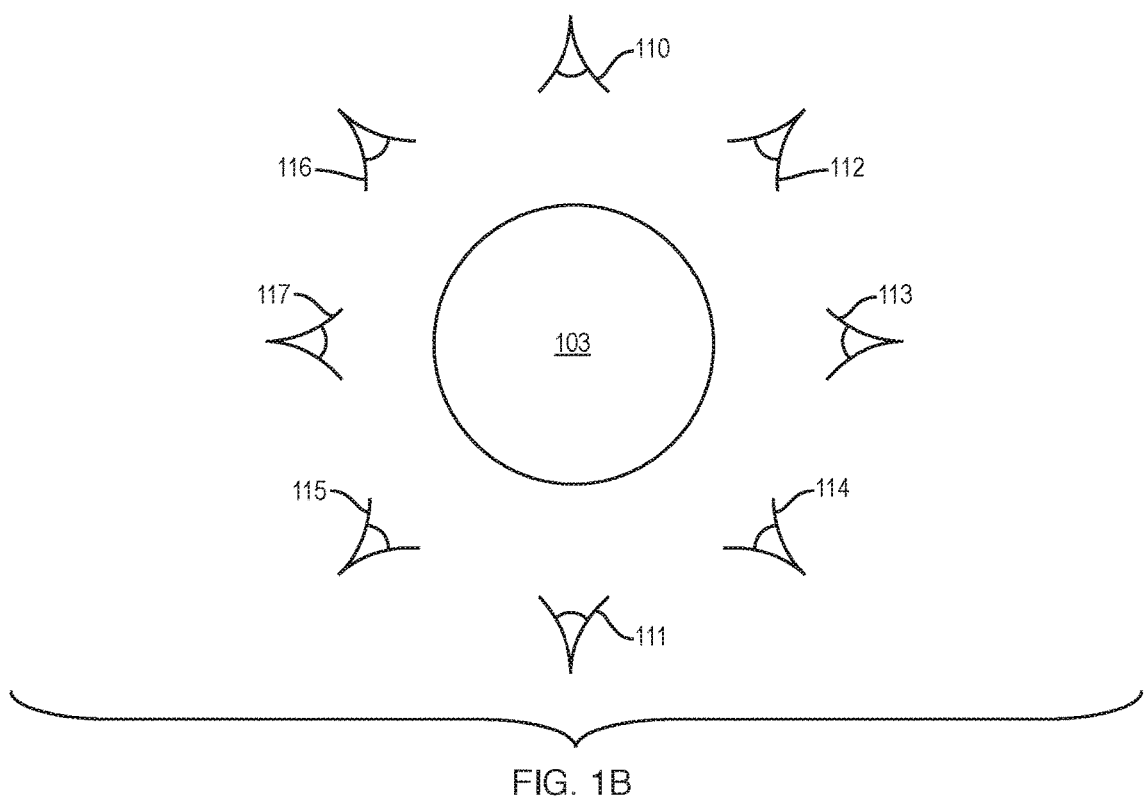
FIG. 1B shows multiple viewing angles from which human viewers view an automultiscopic display.

FIG. 1B shows multiple viewing angles from which human viewers view an automultiscopic display, in an illustrative implementation of this invention. In FIG. 1B, light reflecting from frustum 103 produces an automultiscopic display of a 3D object. Human users 110, 111, 112, 113, 114, 115, 116, 117 may be located at different positions around frustum 103. Because these users are looking at frustum 103 from different viewing angles, each of them may see a different rendered view of the 3D object.

In FIG. 1B, the automultiscopic display (which reflects from frustum 103) has horizontal motion parallax. For instance, in FIG. 1B, if a viewer changes his or her position relative to frustum 103 by a sufficient rotational amount, then the rendered view of the 3D object that is visible to the viewer changes in a way that exhibits horizontal motion parallax.

Figure 1C:
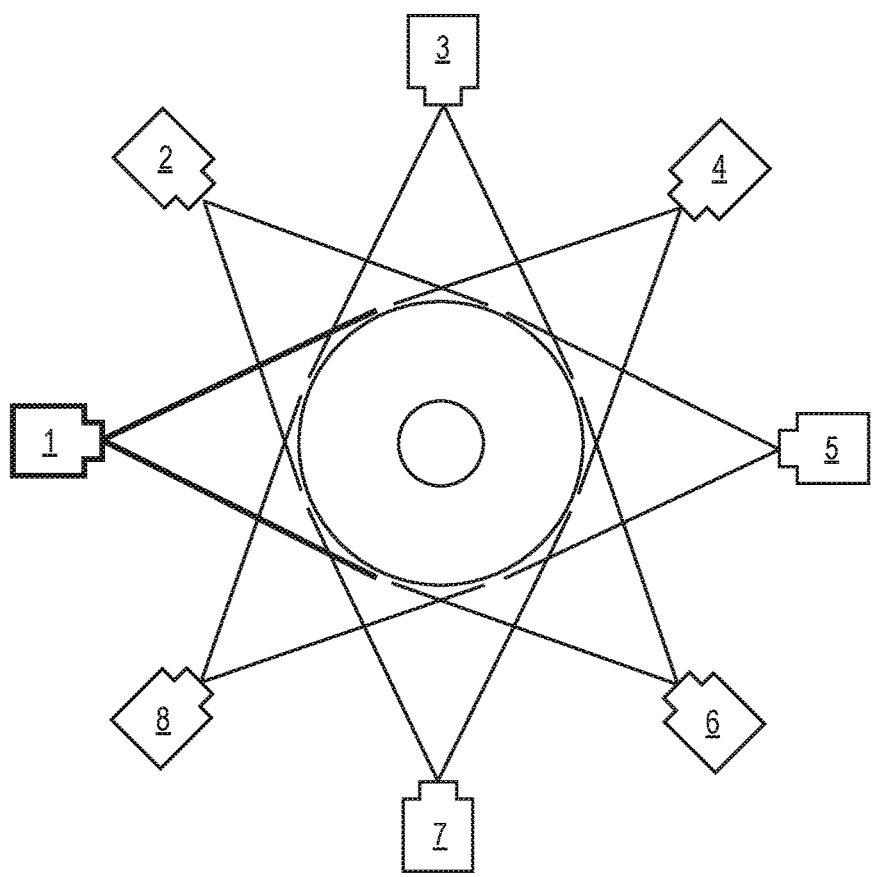
FIG. 1C shows multiple camera angles.

In illustrative implementations, display screen 101 displays multiple rendered views of a 3D object at the same time, to create an automultiscopic display of the 3D object. Each specific view may be derived from a computer graphics rendering that shows how the object would appear if seen from a specific vantage point. For instance, the views of the 3D object that are displayed by display screen 101 may include eight views of the object that are rendered by a computer graphics program, in such a way that the rendered views appear as if they (a) were captured by eight virtual cameras located at positions 1, 2, 3, 4, 5, 6, 7, 8 in FIG. 1C, and then (b) were anamorphically distorted.

The views that are displayed by display screen 101 may be anamorphic distortions of rendered views. The anamorphic distortion may be performed to accommodate radial geometry of components of display device 100.

In some cases, the anamorphic distortion adjusts for varying width of lenticular lenses. For instance: (a) device 100 may produce an automultiscopic display of a 3D object; (b) radial array 102 may comprise a radial pattern of lenticular lens that radiate out from the center of radial array 102; (c) each lenticular lens in the radial pattern may be narrower at one end of the lens than at the other, with the wider end being closer to the periphery of radial array 102 than to the center of radial array 102; (d) a specific, elongated region of display screen 101 which displays a specific slice of a rendered view of the 3D object may be located under an elongated portion of a specific lenticular lens and may be narrower at one end of the specific lens than at the other end of the specific lens, with the wider end being closer to the periphery of radial array 102 than to the center of radial array 102; and (e) the specific slice may be anamorphically distorted to match the varying width of the specific lens.

In other cases, the anamorphic distortion adjusts for varying width of slits in a parallax barrier array. For instance: (a) device 100 may produce an automultiscopic display of a 3D object; (b) radial array 102 may comprise a radial pattern of parallax barrier slits that radiate out from the center of radial array 102; (c) each slit in the radial pattern may be narrower at one end of the slit than at the other, with the wider end being closer to the periphery of radial array 102 than to the center of radial array 102; (d) a specific, elongated region of display screen 101 which displays a specific slice of a rendered view of the 3D object may be located under an elongated portion of a specific slit and may be narrower at one end of the slit than at the other end of the slit, with the wider end of the specific region being closer to the periphery of radial array 102 than to the center of radial array 102; and (e) the specific slice may be anamorphically distorted to match the varying width of the slit.

In some cases, each wedge-shaped radial feature (e.g., lenticular lens or parallax barrier segment) of the radial array corresponds to a wedge-shaped region of the mirrored frustum.

For instance, a wedge-shaped region of mirrored frustum 103 may increase in width as height above the radial array increases. To accommodate this, a lenticular lens in radial array 102 that corresponds to this frustum region may be wedge-shaped too, in such a way that the lenticular lens increases in width as distance from the center of radial array 102 increases.

Figure 1D:
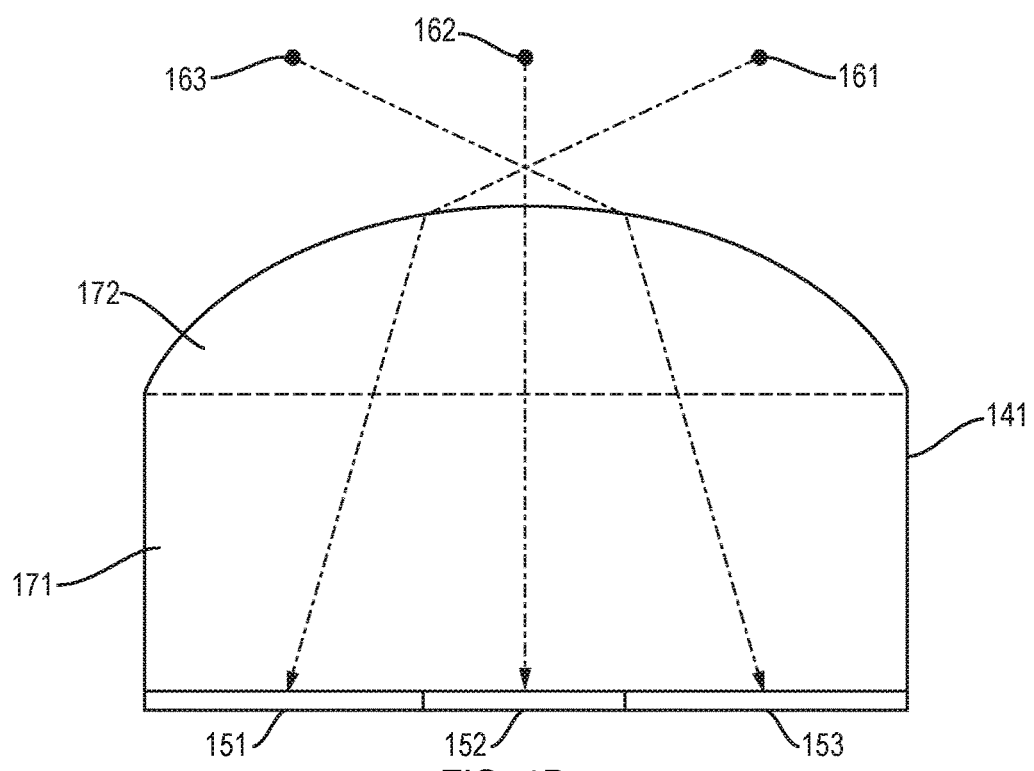
FIG. 1D illustrates that which slice is visible through a lenticular lens may depend on the angle at which the lens is viewed.

FIG. 1D illustrates that which slice is visible through a lenticular lens depends on the angle at which the lens is viewed. FIG. 1D shows a cross-section of a lenticular lens 141. Beneath lens 141, a display screen displays slices 151, 152, 153 of rendered views of a 3D object. Each of these rendered views shows the 3D object as it would appear from different virtual camera angle.

In the example shown in FIG. 1D, if a human viewer located at position 161 were to look at lens 141, then slice 151 would be visible to the viewer through lens 141 and slices 152 and 153 would not. Similarly, if a human viewer located at position 162 were to look at lens 141, then slice 152 would be visible to the viewer through lens 141 and slices 151 and 153 would not. Likewise, if a human viewer located at position 163 were to look at lens 141, then slice 153 would be visible to the viewer through lens 141 and slices 151 and 152 would not.

For clarity of illustration, the optical setup shown in FIG. 1D is simplified by disregarding folding of optical paths. For instance, this optical folding may occur when light (that has passed through lenticular lens 141) reflects from mirrored frustum 103 before traveling to a human viewer.

Figure 2:
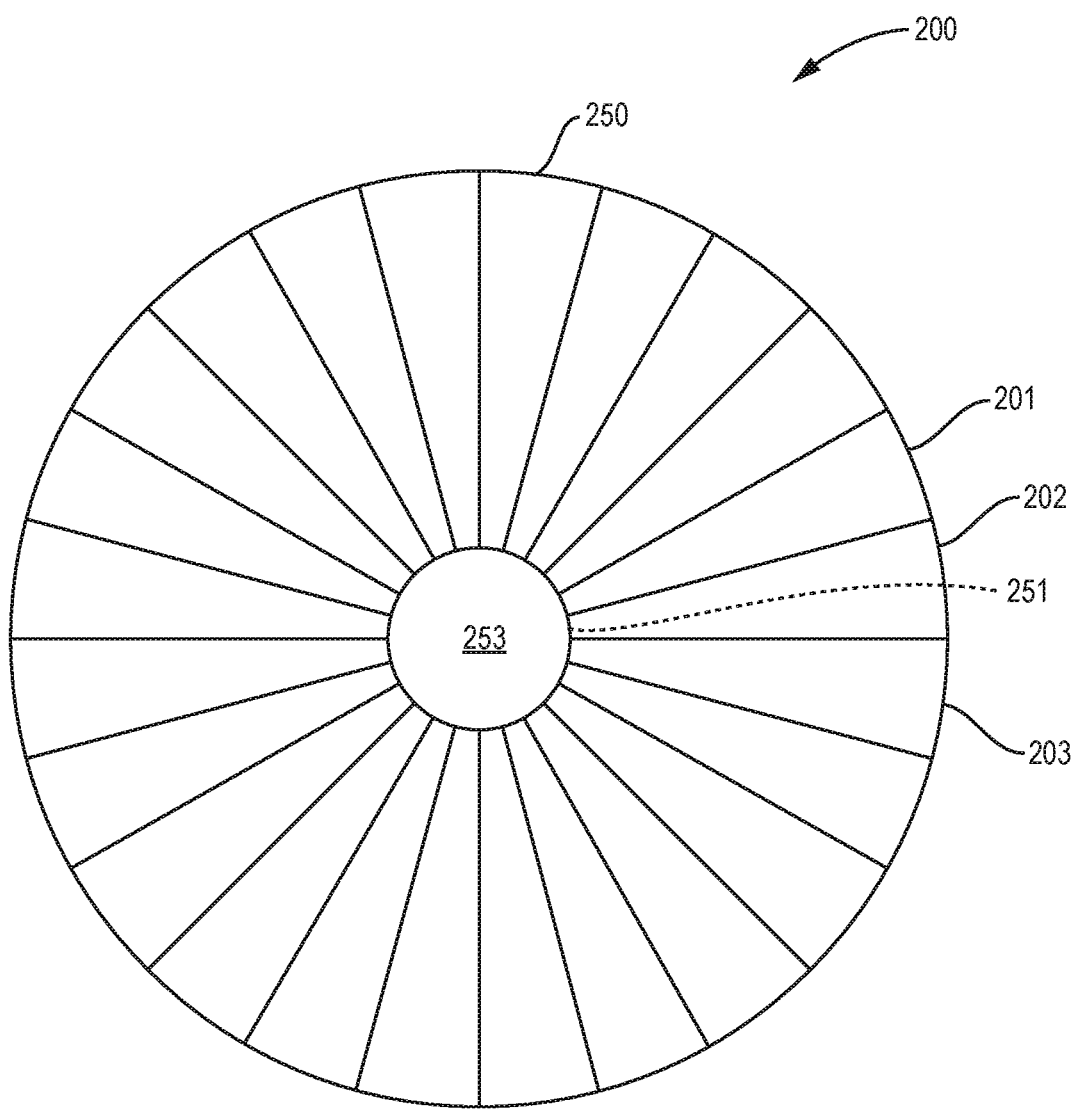
FIG. 2 shows an array of radial optical elements.

FIG. 2 shows an array of radial optical elements, in an illustrative implementation of this invention. In FIG. 2, radial structure 200 comprises radial optical elements (e.g., 201, 202, 203). In some cases, each of these radial elements (e.g., 201, 202, 203) is a lenticular lens. In other cases, each of these radial elements (e.g., 201, 202, 203) is a parallax barrier segment (e.g., a slit and a portion of the parallax barrier structure that surrounds the slit). In FIG. 2, the radial structure has an outer periphery 250 and an inner boundary 251. For instance, outer periphery 250 and inner boundary 251 may each be circular. Radial structure 200 in FIG. 2 may comprise all or part of radial array 102 in FIG. 1.

In many implementations of this invention (including that shown in FIG. 2), the radial optical elements (e.g., 201, 202, 203), such as lenticular lenses or slits, do not extend all of the way to the center of radial structure 200. This is because each radial element may become too narrow, if it were extended all of the way to the center of structure 200. Central region 253 of radial structure 200 may be horizontally enclosed by boundary 251. Central region 253 may comprise a solid material or may be a "donut hole".

In FIG. 2, if radial structure 200 includes an array of lenticular lenses, then: (a) each lenticular lens in the array may be elongated; and (b) each particular slice (of a rendered view of the 3D object) that is displayed under a particular lenticular lens may be displayed by an elongated region of display screen 101 and may be positioned in such a way that the longitudinal axis of the particular lens and the longitudinal axis of the elongated region of the display screen are substantially parallel.

Similarly, in FIG. 2, if radial structure 200 includes an array of parallax barriers, then: (a) each slit in the array may be elongated; and (b) each particular slice (of a rendered view of the 3D object) that is displayed under the particular slit may be displayed by an elongated region of display screen 101 and may be positioned in such a way that the longitudinal axis of the particular slit and the longitudinal axis of the elongated region of the display screen are substantially parallel.

In some implementations, the optical components of display device 100 are in a fixed position relative to each other. For instance, in some cases, display screen 101, radial array 102 and frustum 103 are in a fixed position relative to each other. In some cases, the entire display device 100

(including display screen, radial array and radially symmetric mirror) is lightweight and portable.

Radial Lenticular Array

In some implementations, radial array 102 comprises a radial lenticular array. Each lenticular lens in the array may magnify slices (of rendered views of a 3D object) that are displayed (by a display screen) under the lens. In some cases, which slice is visible beneath a lenticular lens depends on the angle at which the lens is viewed.

To appreciate the advantages of the radial design, it is helpful to first consider a conventional linear array of lenticulars. In a conventional linear array of lenticulars, lenticular lenses are aligned side-by-side in a row, in such a way that: (a) the longitudinal axes of the lenses in the linear array are parallel; and (b) each lens in the linear array has a constant height and width at all points on its longitudinal axis. If a conventional linear array of lenticulars were employed to create an automultiscopic display of a 3D object, then a slice of each rendered view of 3D object (which is displayed by a display screen) would be displayed under each lens in the linear array. This means that for a conventional linear lenticular, the resolution is inversely proportional to the number of views. That becomes challenging for systems that require many views to render the desired effect.

In illustrative implementations of this invention, display screen 101 displays a large number (e.g., 18 or more) of views of a 3D object in order to produce a automultiscopic display of the 3D object. The large number of views improves the resolution of display device 100.

It would be impracticable for a conventional linear array of lenticulars to display such a large number of views. This is because, in a conventional linear array of lenticulars, a slice of each rendered view would be displayed under each lenticular lens.

The inventors solved this problem by employing a radial array of lenticulars, in some implementations of this invention. In these implementations, slices of only a subset of the views—rather than all of the views—are displayed under each lenticular lens in the radial array. Thus, the radial array of lenticulars may be employed to help produce an automultiscopic display of a 3D object, even though slices of only a subset of the rendered views are displayed under each respective lenticular lens in the array. Thus, less views may be required for each lenticular lens. The resolution achieved by the radial array of lenticulars may be higher than that achieved by linear lenticulars, and may allow for more views simultaneously.

In some cases, slices of rendered views of a specific angular portion of the 3D object are displayed by only lenses in a corresponding angular portion of the radial array (e.g., slices of rendered views of a front portion of the 3D object are displayed only under lens in a front portion of the lenticular array). For instance, in some cases, the rendered views that are transmitted through the front portion of the radial array (and thus reflect from the front of the frustum) have no influence on the views that are transmitted through the back portion.

In some cases, the radial array of lenticulars creates higher resolution images than would a linear array of lenticulars.

In some cases, each lenticular lens in the radial array increases in both width and height as it radiates outward toward the periphery of the array. Put differently, in some cases, for each specific lenticular lens in the radial array, the width and height of the specific lens vary as a function of position along the centerline of the specific lens, with width and height increasing the further the position is from the center of the radial array. A lenticular lens in the lenticular array may focus at the same focal plane throughout the length of the lens. The focal length of a lenticular lens in the radial array may be constant at all positions along the centerline of the specific lens. The ratio of width to height of a lenticular lens in the radial array may be constant at all positions along the centerline of the specific lens.

In some cases, the focal length of each lenticular lens may be approximated as the radius of the curved portion of the lens divided by coefficient equal to the lens's index of refraction minus one. In some cases, the focal length extends to the base of the lenticular. Depending on what the lenticular lens is focusing on, there may be an additional distance to reach the desired focal plane. The electronic display screen may have a transparent barrier protecting the light emitting component. The width of that barrier may affect the focal length of the lenticular lenses. The shape of the lens may affect the viewing angle for each lenticular lens which results in a shorter or longer "flip" between views under each lenticular.

In some cases, the angle within the lens may be variable. Lenticular manufacturers may adjust the angle within the lens resulting in a substrate of variable height below the surface of the lenses. This may impact the angle outside the lens or the viewing angle of the lenticular lens. This may be calculated by the formula:

$$O = 2\left(\sin^{-1}\left(\frac{p}{2 \times r}\right)\right)$$

where p represents the width of each lenticular lens and r represents the radius of the curvature of the lens.

Figure 8A:
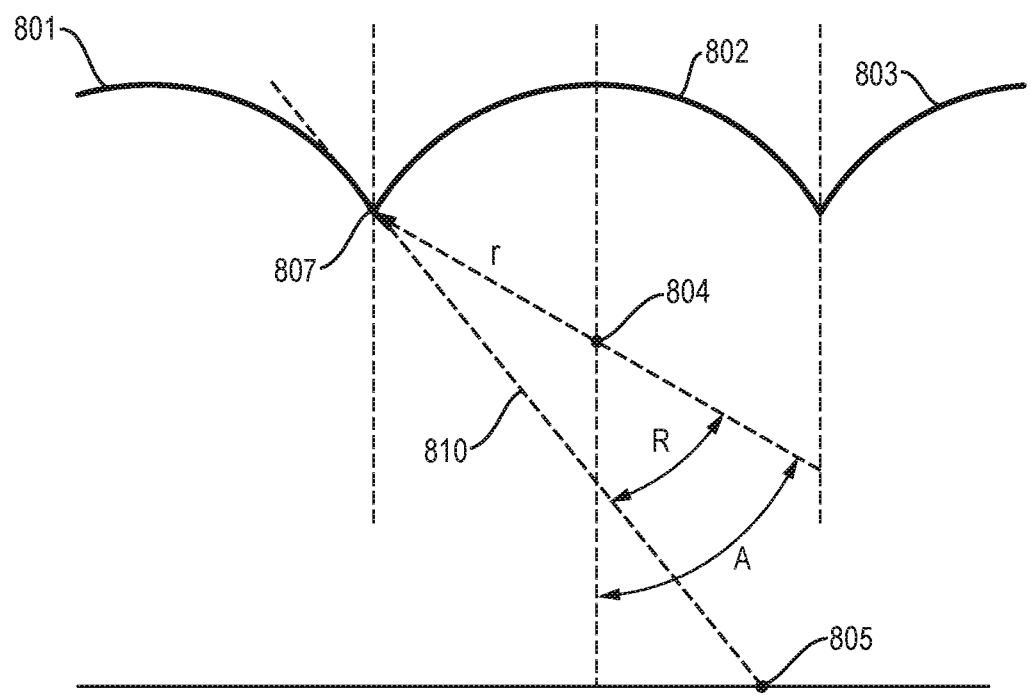
FIGS. 8A and 8B show examples of angles in lenticular lenses.
Figure 8B:
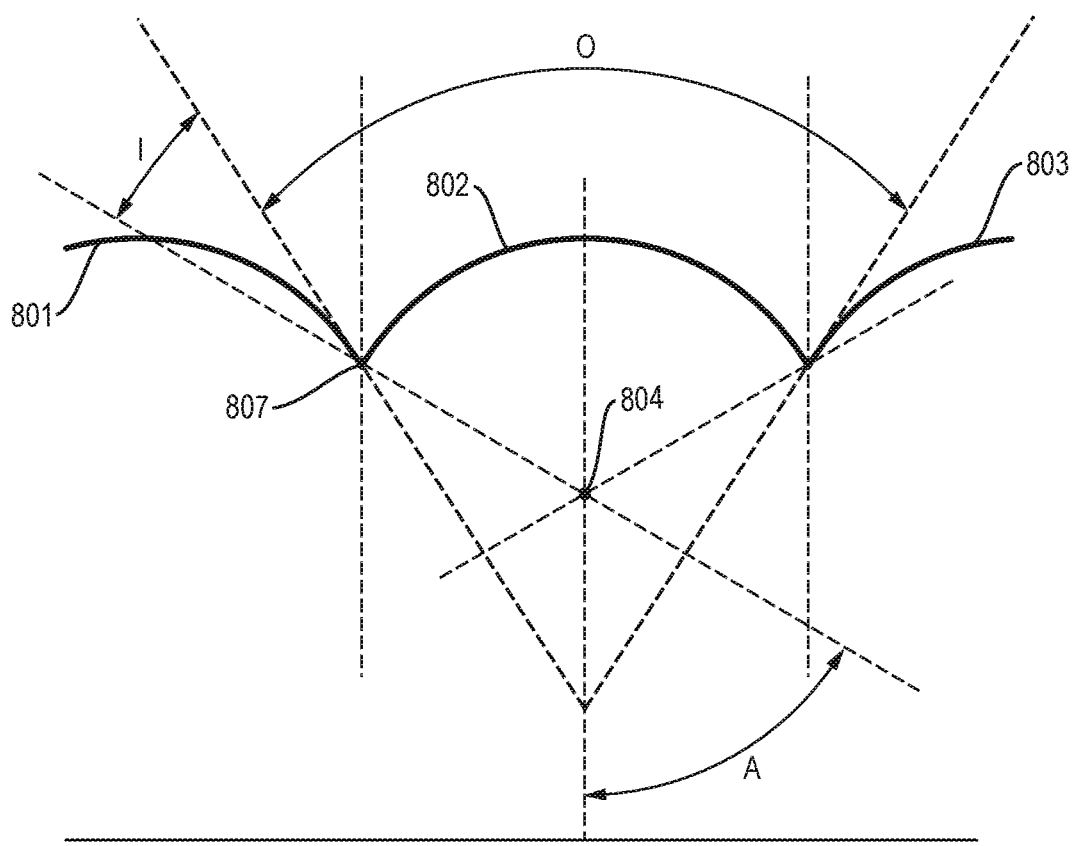

FIGS. 8A and 8B show examples of angles in lenticular lenses, including the angle within a lens, the angle outside a lens and the viewing angle.

In FIGS. 8A and 8B, lenticular lenses 801, 802, 803 each include a curved region and a substrate (which is beneath the curved region).

In lenticular lens 802 in FIG. 8A, angle R is what some would call the "angle within the lens". In FIG. 8A, the radius r of the curved region in lenticular lens 802 is the distance between point 804 and the periphery of the curved region. Ray 810 may be the most extreme light ray that is refracted correctly by lenticular lens 802. This ray may start at point 805 (which is at the bottom of lenticular lens 802) and may exit the lenticular array at point 807. Point 807 may be on the top surface of the lenticular array, and may be located where the curved region of lenticular lens 801 meets the curved region of lenticular lens 802.

In lenticular lens 802 in FIG. 8B, angle O is what some would call the "angle outside the lens" or the "viewing angle of the lens." In some cases, O=2(A−I), where A is angle A from FIG. 8A and Angle I is the angle between (a) extreme ray 810 and (b) the normal outside the lens.

In some cases, the array of lenticular lenses is made from one or more of the following materials: PMMA (poly (methyl methacrylate), also known as Acrylic), APET (amorphous polyethylene terephthalate), PETG (polyethylene terephthalate glycol-modified), polycarbonate, polypropylene, PVC (polyvinyl chloride) and polystyrene. The lenticular lens array may be subtractive manufactured, 3D printed or cast in an injection mold.

Figure 3A:
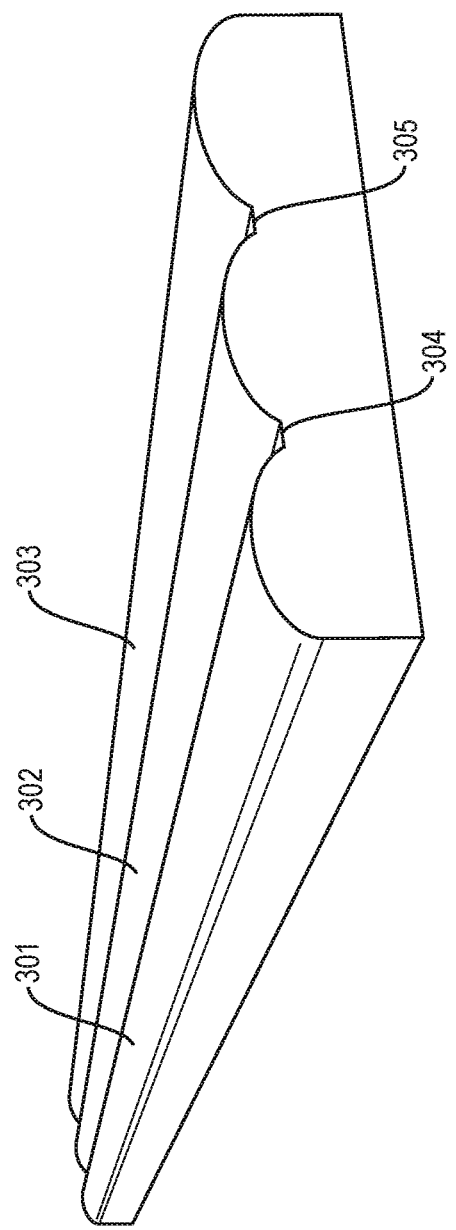
FIG. 3A shows a portion of a lenticular array, in which each of the lenticular lenses has a convex surface.

FIG. 3A shows a portion of a lenticular array, in which each of the lenticular lenses (e.g., 301, 302, 303) has a convex surface. Optionally, there may be spaces (e.g., 304, 305) between neighboring convex lenticular lenses.

In some cases, each lenticular lens includes a curved upper region and a lower, straight-walled region. An example of this is shown in FIG. 3A. Likewise, in FIG. 1D, lenticular lens 141 comprises (a) a first region 171 and a second region 172, where: (a) the first region 171 is bounded on at least two sides by straight vertical walls of the lens; and (b) the second region 172 has a curved external upper surface. In FIG. 1D, the second region 172 (with a curved upper surface) is above the first region 171 (with straight vertical walls). Thus, first region 171 may be closer to display surface 101 than is the second region.

Alternatively, in some cases, each lenticular lenses consists of only a curved region (e.g., curved region 172 in FIG. 1D).

Figure 3B:
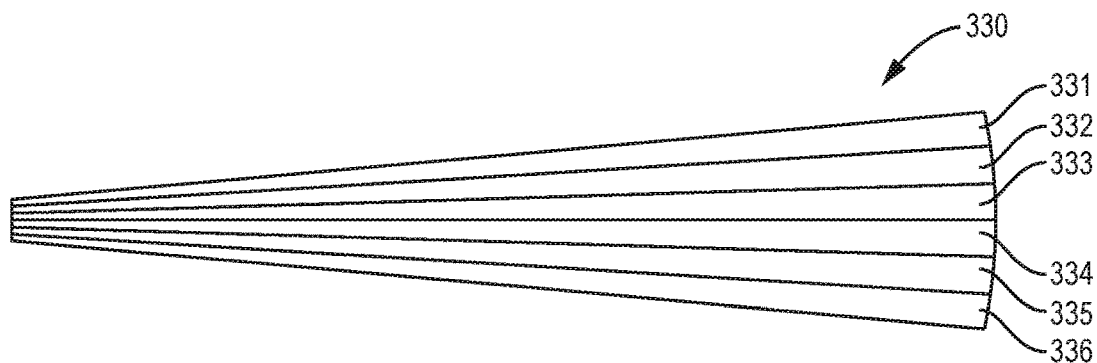
FIG. 3B shows a region of a display screen.

FIG. 3B shows a top orthographic view of a region 330 of display screen 101. In FIG. 3B, region 330 of display screen 101 displays slices 331, 332, 332, 334, 335, 336 of rendered views of a 3D object. Region 330 of display screen 101 is under a single radial element (e.g., under a lenticular lens or under a slit of a parallax barrier). The radial element may be part of radial array 102.

Figure 3C:
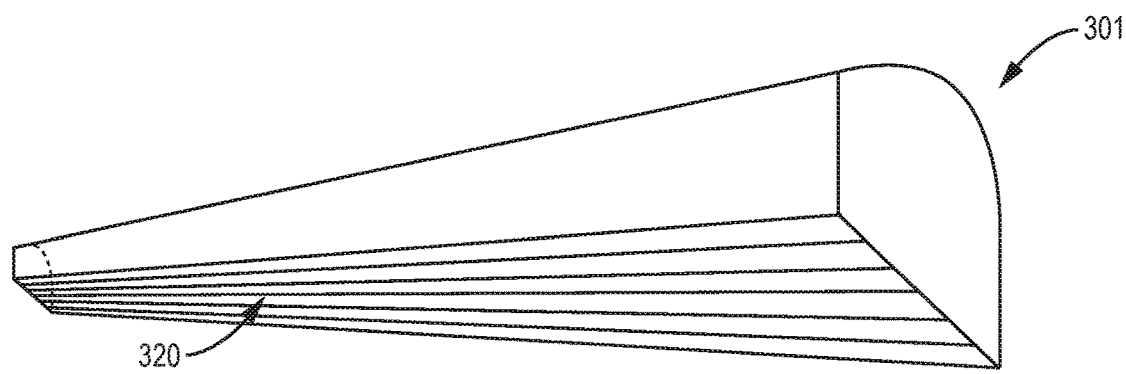
FIG. 3C shows slices of multiple rendered views of a 3D object, which slices are displayed under a single convex lenticular lens by a display screen.
Figure 3D:
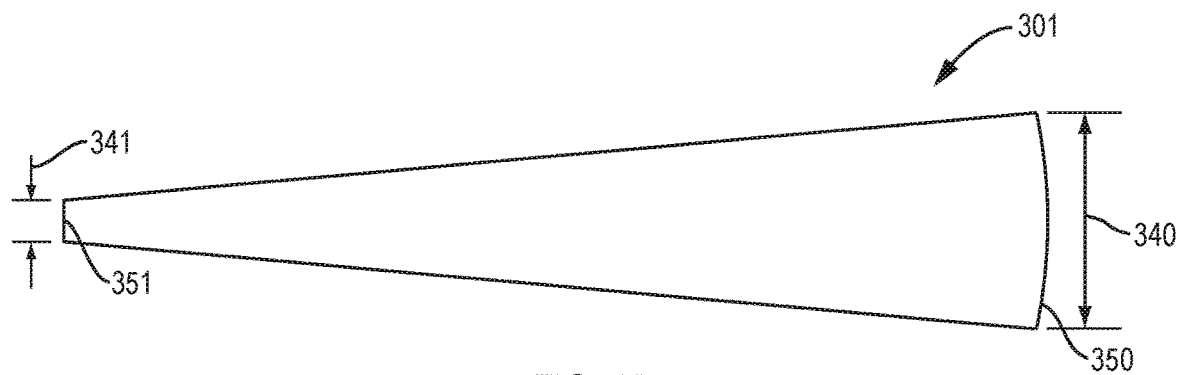
FIG. 3D is a top orthographic view of a lenticular lens, which lens is wider at the one end than at the other.
Figure 3E:
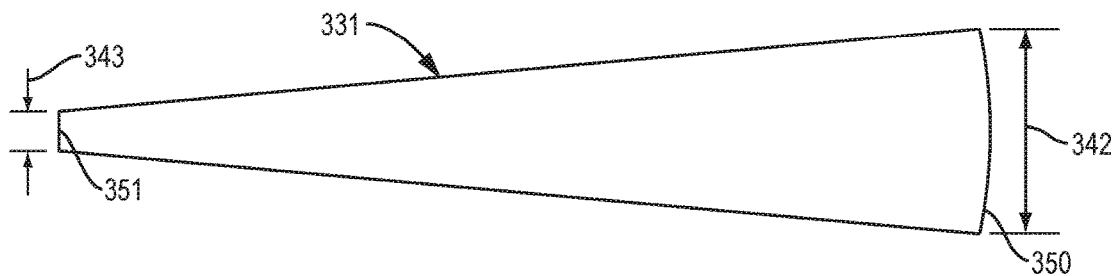
FIG. 3E is a top orthographic view of a region of the display screen, which region is wider at one end than at the other.
Figure 3F:
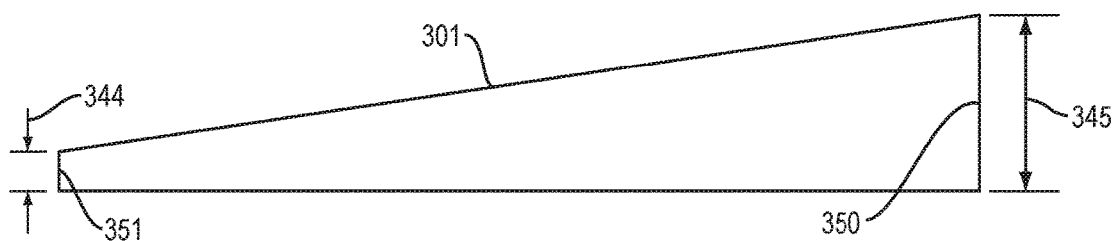
FIG. 3F is a side orthogonal view of a lenticular lens. The lens is higher at one end than at the other.
Figure 3G:
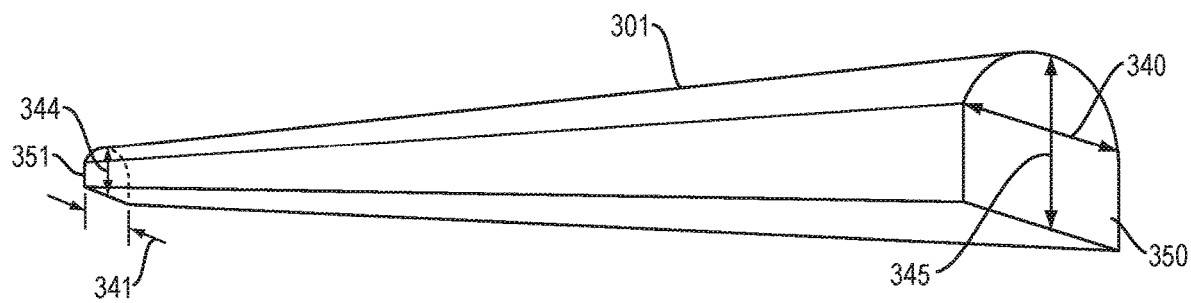
FIG. 3G is a perspective view of a lenticular lens. The lens is higher and wider at the one end than at the other.

FIGS. 3C and 3G are each a perspective view of a lenticular lens, in which the lens is seen from a vantage point that is beneath (and off to the side of) the lens.

FIG. 3C shows (a) a convex lenticular lens 301; and (b) slices 320 of rendered views of a three-dimensional object, which slices are displayed under convex lens 301 by a display screen.

In FIGS. 3B and 3C, each slice is a slice of a rendered view, which view shows a three-dimensional object from a different virtual camera angle. The sliced view may have been rendered by a computer graphics program.

In some implementations of this invention, each lenticular lens is wider at one end of the lens than at the other. FIG. 3D is a top orthogonal view of a lenticular lens. This lens 301 is wider at the one end than at the other. For instance, in FIG. 3F: (a) distance 341 is the width of lens 301 at the inner radial end 351 of lens 301; (b) distance 340 is the width of lens 301 at the outer radial end 350 of lens 301; and (c) distance 341 is less than distance 340.

Likewise, in some implementations of this invention, each region of the display screen that is under a specific lenticular lens (and that displays the slices that are visible through the specific lenticular lens) is wider at one end of the region than at the other. FIG. 3E is a top orthographic view of such a region of the display screen. This region 331 is wider at one end than at the other. For instance: (a) distance 343 is the width of region 331 at the inner radial end 351 of region 331; (b) distance 342 is the width of region 331 at the outer radial end 350 of region 331; and (c) distance 343 is less than distance 342.

In some implementations of this invention, each lenticular lens is higher at one end of the lens than at the other. FIG. 3F is a side orthogonal view of a lenticular lens. This lens 301 is higher at one end than at the other. For instance: (a) distance 344 is the height of lens 301 at the inner radial end 351 of lens 301; (b) distance 345 is the width of lens 301 at the outer radial end 350 of lens 301; and (c) distance 344 is less than distance 345.

In FIGS. 3D, 3E, 3F and 3G: (a) inner radial end 351 of lens 301 may be spatially co-located with a portion of inner boundary 251 in FIG. 2; and (b) outer radial end 350 of lens 301 may be spatially co-located with a portion of outer periphery 250 in FIG. 2.

In some implementations of this invention, each lenticular lens is both higher and wider at one end of the lens than at the other. FIG. 3G is a perspective view of a lenticular lens. In FIG. 3G, this lens 301 is higher and wider at the one end than at the other.

In some implementations, the aspect ratio (ratio of width to height) of a lenticular lens remains constant throughout the entire lens, including (a) at all points along the longitudinal axis of the lens and (b) at all radial distances from the center of radial structure 200. In some implementations, as the width of the lenticular lens increases, the height of the lens increases proportionally. This may keep the focal distance (or the focal plane) of the lens constant.

Rendered Views

Figure 4:
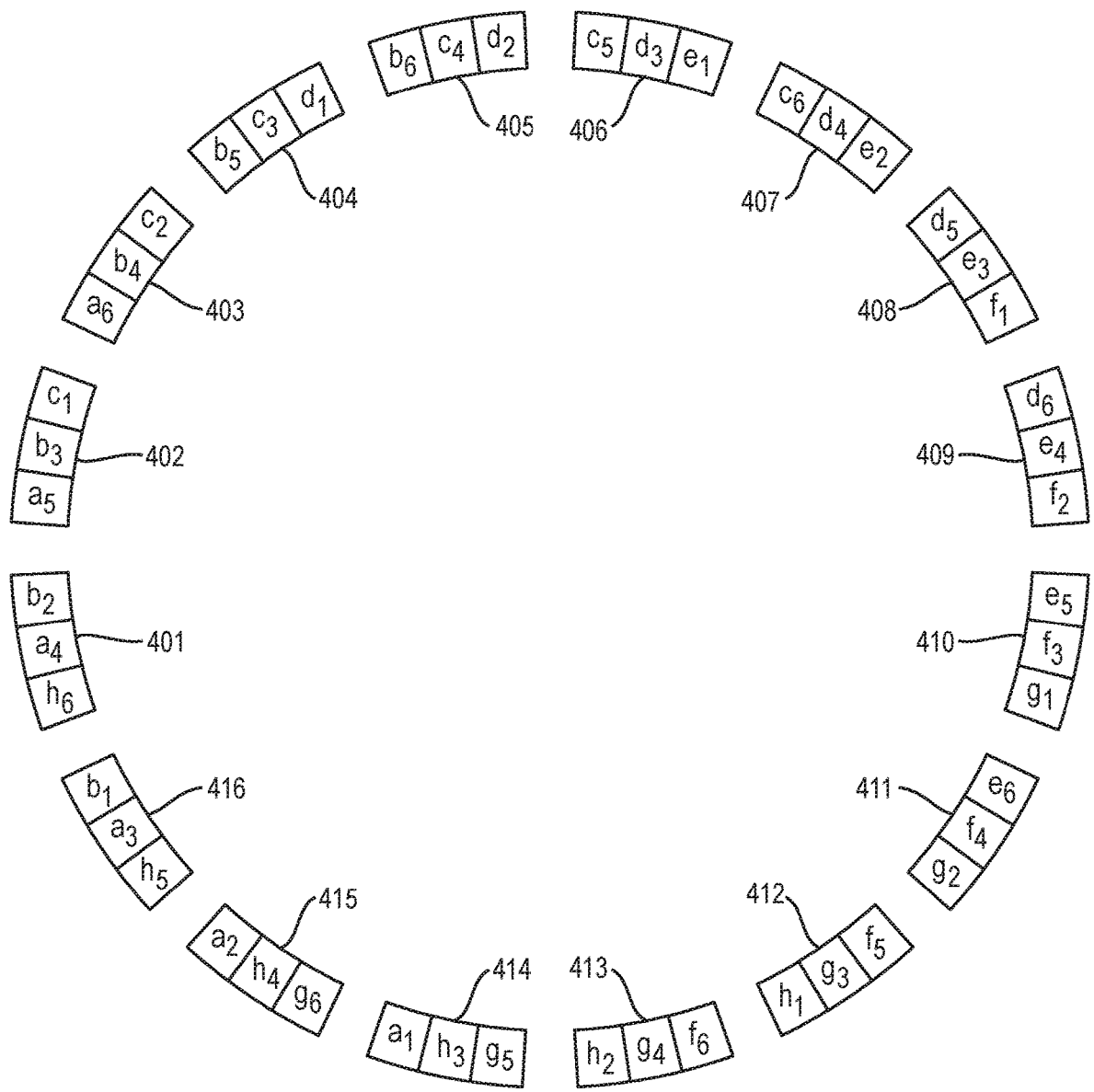
FIG. 4 illustrates an example in which slices of only a subset of the rendered views are displayed under each lenticular lens.

FIG. 4 shows an example in which slices of a given rendered view are displayed under only some, but not all, of the lenticular lenses in a radial array. Put differently, in FIG. 4, slices of a given rendered view are displayed under only a subset of the lenticular lenses in the radial array.

In the example shown in FIG. 4, a display screen displays slices under lenticular lenses 401, 402, 403, 404, 405, 406, 407, 408, 409, 410, 411, 412, 413, 414, 415, 416.

For ease of illustration, FIG. 4 shows only a small number of slices, lenticular lenses, and rendered views. In practice, however, the number of slices, lenticular lenses, and rendered views may be much larger.

For ease of illustration, in FIG. 4, lenticular lenses 401-416 (and the slices displayed under them) are shortened. In practice, however, the lenticular lenses may be more elongated and extend closer to the center of the radial structure (similar to the configuration shown in FIG. 2). Likewise, in practice, slices that are displayed under the lenticular lenses may be more elongated and extend closer to the center of the radial structure In FIG. 4, a display screen displays multiple rendered views of a 3D object. In FIG. 4, each of these rendered views is represented by a letter. Thus, in FIG. 4, a total of eight rendered views (views a, b, c, d, e, f, g, h) of the 3D object are displayed by the display screen. In FIG. 4, each of these eight rendered views shows the 3D object as it appears from a different camera angle.

In FIG. 4, each rendered view is divided into six slices. Thus, in FIG. 4, the display screen displays 48 slices at the same time (8 slices×6 slices/view=48 slices). For instance, in FIG. 4, rendered view a is divided into slice $a_1$, slice $a_2$, slice $a_3$, slice $a_4$, slice $a_5$, and slice $a_6$. Likewise: (1) rendered view b is divided into slices $b_1$, $b_2$, $b_3$, $b_4$, $b_5$, $b_6$; (2) rendered view c is divided into slices $c_1$, $c_2$, $c_3$, $c_4$, $c_5$, $c_6$; (3) rendered view d is divided into slices $d_1$, $d_2$, $d_3$, $d_4$, $d_5$, $d_6$; (4) rendered view e is divided into slices $e_1$, $e_2$, $e_3$, $e_4$, $e_5$, $e_6$; (5) rendered view f is divided into slices $f_1$, $f_2$, $f_3$, $f_4$, $f_5$, $f_6$; (6) rendered view g is divided into slices $g_1$, $g_2$, $g_3$, $g_4$, $g_5$, $g_6$; (7) rendered view h is divided into slices $h_1$, $h_2$, $h_3$, $h_4$, $h_5$, $h_6$.

In FIG. 4, multiple slices of the same rendered view are displayed at the same time, each under a different each lenticular lens. For instance, in FIG. 14, slices $b_1$, $b_2$, $b_3$, $b_4$, $b_5$, $b_6$ of rendered view b are displayed under lenticular lenses 416, 401, 402, 403, 404, 405, respectively.

In FIG. 4, each slice of a specific rendered view is different than each other slice of the specific rendered view. For instance, each slice of rendered view b is different than each other slice of rendered view b.

In FIG. 4, slices of a specific rendered view are displayed under some, but not all of, the lenticular lenses of the radial array. For instance, in FIG. 4: (a) six slices of rendered view a are displayed under six lenticular lenses 401, 402, 403, 414, 415, 416, one slice per lens; and (b) no slice of rendered view a is displayed under any other lenticular lens in the radial array.

In FIG. 4, a configuration of slices of rendered views may spatially repeat—that is, may be displayed under multiple adjacent lenticular lenses at the same time. Each configuration may consist of one slice from each rendered view in an ordered set of rendered views. For instance, in FIG. 4, a configuration that consists of one slice from each of rendered views a, b, c (in that order) is displayed under both lenticular lens 402 and lenticular lens 403. Note that: (a) the slices under lenticular lens 402 (i.e., slices $a_5$, $b_3$, $c_1$) are different than the slices under lenticular lens 403 (i.e., slices $a_6$, $b_4$, $c_2$); (b) the particular configuration of slices (i.e., one slice from each of rendered views a, b, c, in that order) is the same under these two lenses; and (c) this particular configuration of slices (one slice from each of rendered views a, b, c, in that order) is displayed under some but not all of the lenticular lenses in the array.

The preceding 9 paragraphs involve slices that are displayed under a radial array of lenticular lenses. Alternatively, the radial array may comprise a radial array of parallax barriers. The preceding 9 paragraphs apply to a radial array of parallax barriers as well (e.g., by replacing the phrase "lenticular lens" with the word "slit" each time that it appears in those paragraphs).

Radial Parallax Barrier

In some implementations, a radial parallax barrier is employed. A display screen may display slices of multiple views of a 3D object under a single slit of a parallax barrier. Which of the slices are visible to a user may depend on the angle at which the user looks at the parallax barrier. The parallax barrier may: (a) physically occlude direct line-of-sight between a human and certain slices that are under the parallax barrier; and (b) may allow line-of-sight between the human and one or more other slices that are under the parallax barrier.

In some implementations: (a) each parallax segment comprises a slit and surrounding opaque region; (b) the size of each parallax segment is slightly larger than the size of the display screen region that is under the slit and that displays slices which are visible through the slit. The scale factor (of the parallax segment relative to the corresponding display region) may be related to the distance between the parallax segment and the display screen. By increasing the distance between the parallax barrier and the monitor, the angular distance between each "flip" (i.e., between each change in virtual camera angle of the display) may increase. The size of each opaque region in relation to the whole parallax segment (including both opaque region and slit) may be a ratio of 1:(number of views−1). For example, in some cases: (a) there are seven different views per each parallax segment; and (b) the width of the opaque region is equal to six times the width of the slit.

In some cases, each parallax segment in the radial parallax barrier array has a wedge shape which becomes wider as distance from the center of the radial array increases.

Figure 5A:
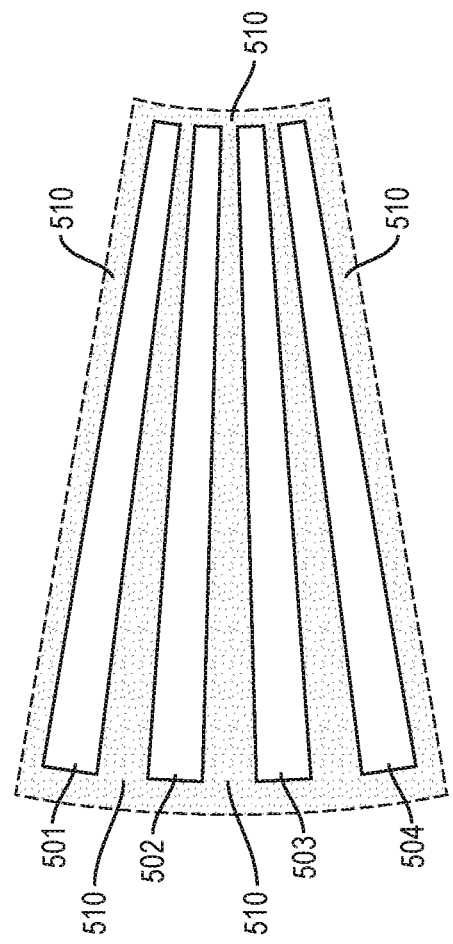
FIG. 5A shows a top orthographic view of a portion of a radial parallax barrier array.

FIG. 5A shows a top orthogonal view of a portion of a radial parallax barrier array. In FIG. 5A, slits 501, 502, 503, 504 are surrounded by a parallax barrier structure 510. These slits radiate out from a central region (which central region is to the right of the slits in FIG. 5A).

Figure 5B:
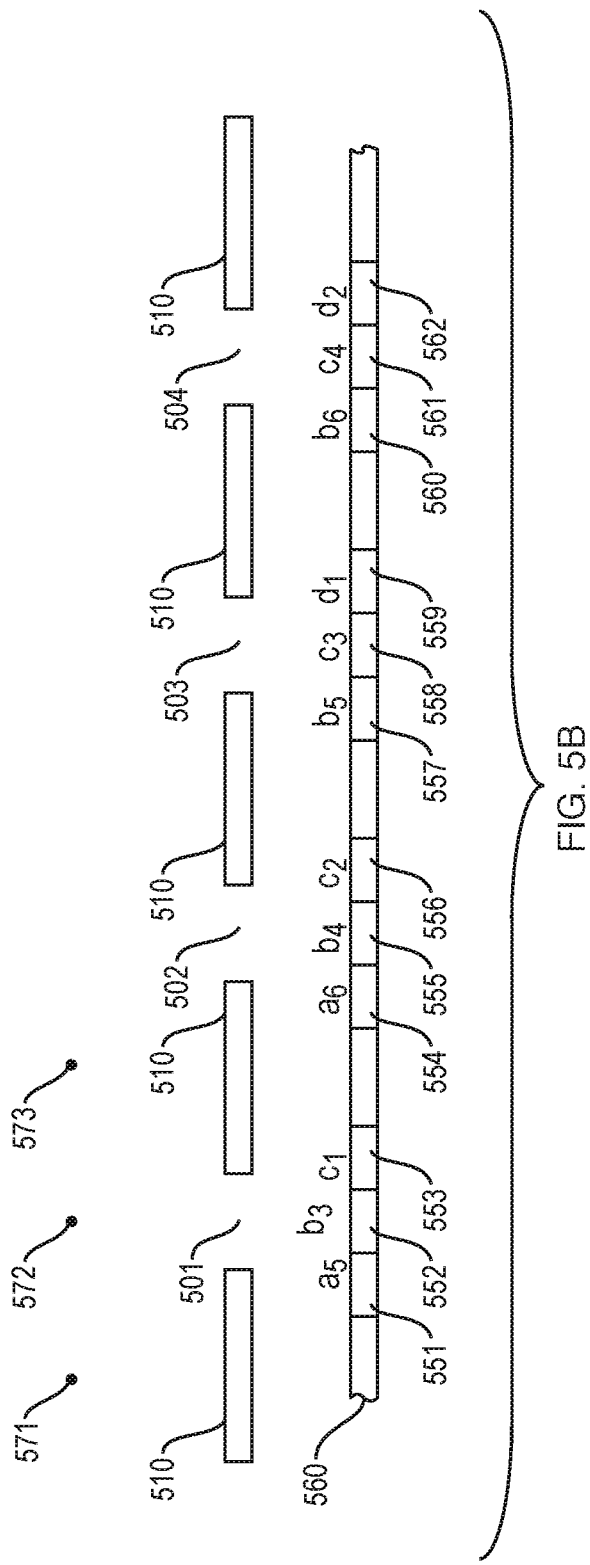
FIG. 5B is a cross-sectional view of the same portion of the parallax barrier array.

FIG. 5B is a cross-sectional view of the same portion of the parallax barrier array.

In FIG. 5B, display screen 560 displays slices of multiple rendered views of a 3D object. Specifically, the portion of display screen 560 shown in FIG. 5B displays: (1) slices of rendered view a (e.g., slices $a_5$, $a_6$); (2) slices of rendered view b (e.g., slices $b_3$, $b_4$, $b_5$, $b_6$); (3) slices of rendered view C (e.g., slices $c_1$, $c_2$, $c_3$, $c_4$); and (4) slices of rendered view d (e.g., slices $d_1$, $d_2$).

In FIG. 5B, different regions of display screen 560 display different slices of rendered views of the 3D object. For instance, in FIG. 5B, display regions 551, 552, 553 are located under slit 501 and display slices $a_5$, $b_3$, $c_1$, respectively. Likewise, display regions 554, 555, 556 are located under slit 502 and display slices $a_6$, $b_4$, $c_2$, respectively. Similarly, display regions 557, 558, 559 are located under slit 503 and display slices $b_5$, $c_3$, $d_1$, respectively. Also, display regions 560, 561, 562 are located under slit 504 and display slices $b_6$, $c_4$, $d_2$, respectively.

In FIG. 5B: (a) the rendered views that are displayed under a slit may repeat from slit to slit (e.g., the same rendered views a, b, c are displayed under each of slits 501 and 502); and (b) the rendered views that are displayed under a slit may change from slit to slit (views a, b, c are under each of slits 501 and 502, but views b, c, d are under each of slits 503 and 504.

In some implementations, which slice (out of a set of slices under a slit) is visible to a human viewer depends on the angle at which the viewer looks at the slit. For instance, in FIG. 5B, if a human user is located at position 571 and looks at slit 501, then the user sees slice $c_1$ (being displayed by display region 553). Likewise, if a human user is located at position 572 and looks at slit 501, then the user sees slice $b_3$ (being displayed by display region 552). Similarly, if a human user is located at position 573 and looks at slit 501, then the user sees slice $a_5$ (being displayed by display region 551).

Figure 5C:
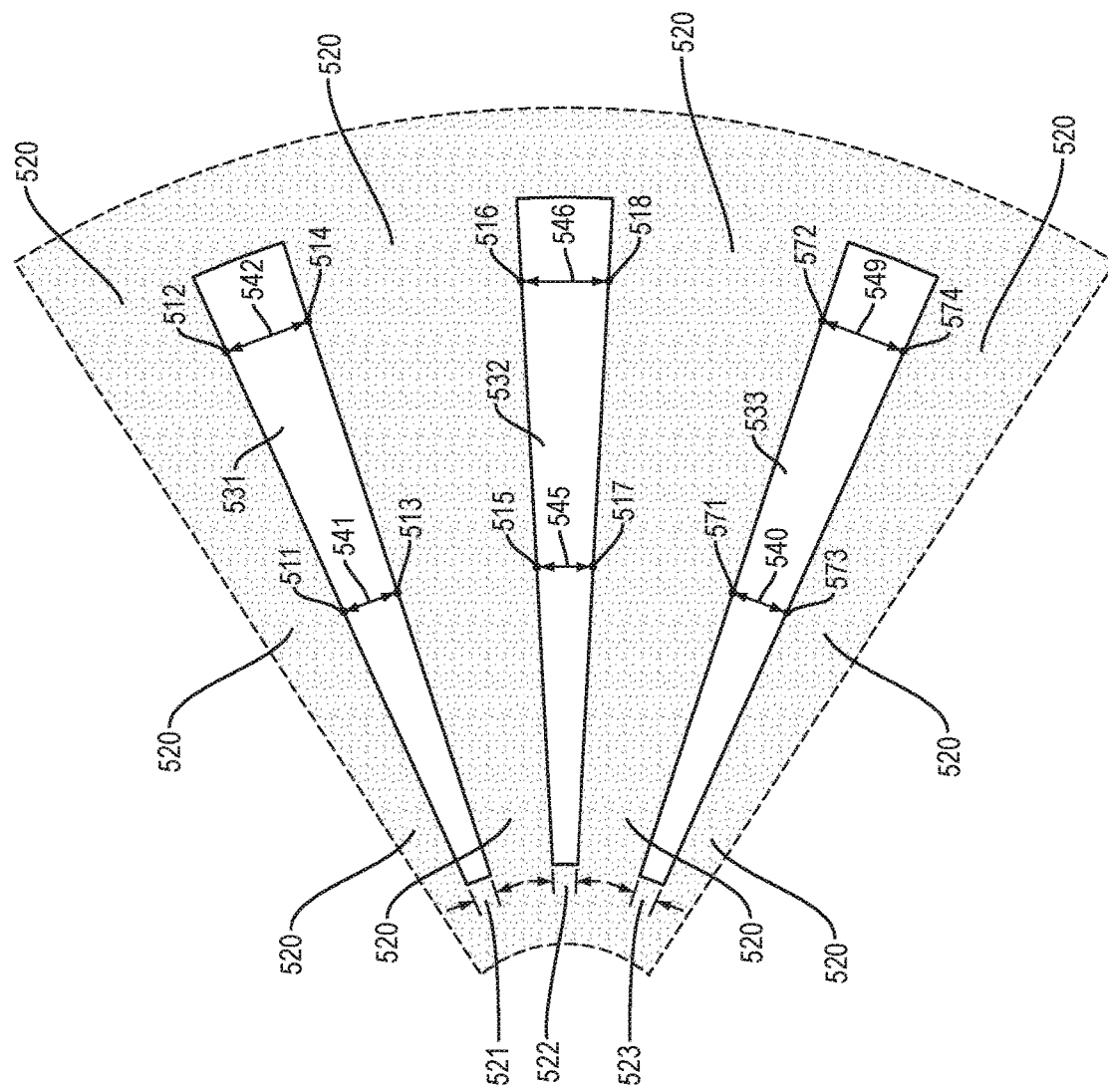
FIG. 5C shows slits in a portion of a radial parallax barrier array. The slits are wider at one end than at the other end.

FIG. 5C shows slits in a portion of a radial parallax barrier array. In FIG. 5C, slits 531, 532, 533 are wider at one end than at the other end. These slits are part of a radial pattern, and become wider as they radiate out from a central region (which central region is to the left of the slits in FIG. 5C). Slits 531, 532, 533 are surrounded by an opaque parallax structure 520.

In FIG. 5C: (a) the inner radial ends of the slits (on the left side of FIG. 5C) are at a first radial distance from the central region; (b) points 511, 513, 515, 517, 571, 573 are at a second radial distance from the central region; and (c) points 512, 514, 516, 518, 572, 574 are at a third radial distance from the central region.

In FIG. 5C, the slit width (e.g., 521, 522, 523) at the first radial distance is less than the slit width (e.g., 541, 545, 540) at the second radial distance, which is, in turn, less than the slit width (e.g., 542, 546, 549) at the third radial distance In some implementations, at a given radial distance (from the center of the radial structure), the ratio of the width $w_s$ of each slit to the width $w_p$ of each parallax barrier (region between two slits) is equal to 1:(number of views−1). For instance, if 7 different views are visible under each slit (albeit from different viewing angles), then the ratio of the slit width $w_s$ to the parallax barrier width $w_p$ is 1:6.

In some cases, the "slit" in each parallax barrier segment is an elongated hole. Alternatively, the "slit" in each parallax barrier segment may be a solid, transparent aperture.

In some cases, a radial parallax barrier may be fabricated by printing ink on transparency paper (e.g., with an inkjet printer). The regions of the transparency paper that are covered by ink may comprise the opaque regions of the barrier. Likewise, the regions of the transparency paper that are not covered by ink may comprise the transparent apertures.

Preferably, in parallax barrier implementations, there is a gap between the display screen and the parallax barrier plane. In some implementations, the greater the size of the gap, the greater is the size of each parallax barrier wedge. The size of the gap may influence how quickly visible rendered views shift into visible position under a slit. In some cases, the greater the size of the gap, the more quickly the rendered views shift into position. Put differently, in some cases, the greater the size of the gap, the less the amount of angular change in observer position that causes a change in the rendered view that is visible to the observer.

In some cases, the ratio of the width of the aperture to the width of the barrier per each wedge of the parallax barrier is (the number of views under each wedge−1):1. For example, in some cases, if there were 5 views under each parallax barrier wedge, then the barrier portion of the wedge would represent 80% of the total width of the wedge while the aperture would represent 20% of the total width of the wedge.

3D Automultiscopic Display

In illustrative implementations, the display device comprises a radially symmetric mirror, radial lenticular and a computer screen. The display device may output an automultiscopic display that is viewable throughout an angular region of up to 360 degrees. This display may have discrete imagery that varies based on angular position around the display.

In some implementations, a 3D scene is rendered in a game engine, virtual cameras are generated to capture the scene, and a shader program is applied to partition the views from the virtual cameras for display on the display screen.

In some implementations, a radial lenticular array or a radial parallax barrier array creates horizontal motion parallax. As a user walks around the display, different rendered views of a 3D object may be visible to the user, in such a way that a different rendered view is visible in each different viewing zone around the display.

Light from the display screen may pass through a radial lenticular array, in such a way that each lenticular lens in the array partitions the pixels that are directly underneath the lens into angular paths. As the user moves off axis of the lenticular lens, new views may come into focus and be magnified under the lens. If a user is standing directly in front of a lenticular lens (e.g., in a position such that the centerline of the lens points directly at the user), the rendered view that is directly under the lens may be in focus and may reflect off the mirror (at an angle that has zero degrees of horizontal component) directly toward the user. However, if a lenticular lens is very off-axis to the user, light that is from a rendered view and that passes through the off-axis lens may reflect off the radially symmetric mirror in a direction that is not toward the user, so that the user does not see the rendered views under these off-axis lens.

In some cases, as the user moves around the display, the rendered views that are opposite the user (i.e. on the other side of the radially symmetric mirror) are not visible to the user.

In order to generate the views of the 3D object that are rendered on the display screen, the values of three independent variables may be selected: (a) the number of the virtual cameras/views/viewing zones; (b) the number of views per lenticular lens; and (c) the number of times that each specific view sequence repeats.

Number of Virtual Cameras: In order to decrease transitional areas in the display, it is desirable to increase the number of virtual cameras.

Number of Views Per Lenticular Lens: In some cases, the number of views per lenticular lens is variable and controls how quickly the rendered view that is visible to a user changes based on the user's angular position relative to the display. Increasing the number of times that each specific view sequence repeats may increase horizontal resolution and size of the virtual image.

Number of Repetitions of View Sequence: A view sequence may spatially repeat—that is, may be displayed under multiple lenticular lenses at the same time. A view sequence may consist of one slice from each rendered view in an ordered set of rendered views. For instance, in FIG. 4, a view sequence that consists of one slice from each of rendered views a, b, c (in that order) is displayed under both lenticular lens 402 and lenticular lens 403.

Note that: (a) the slices under lenticular lens 402 (i.e., slices $a_5$, $b_3$, $c_1$) are different than the slices under lenticular lens 403 (i.e., slices $a_6$, $b_4$, $c_2$); but (b) the view sequence (i.e., one slice from each of rendered views a, b, c, in that order) is the same under these two lenses. In the preceding sentence, each slice is described by a letter and a numerical subscript, where the letter specifies the rendered view (which corresponds to a virtual camera view) and the numerical subscript identifies a particular slice of the rendered view. For instance, in the first sentence of this paragraph, slice $a_6$ refers to the sixth slice of rendered view a (where rendered view a corresponds to a particular virtual camera view). Each slice may be a portion (or subimage) of a rendered view. For example, if the rendered view is wedge-shaped, then the slice may be a wedge-shaped portion of the rendered view.

In some implementations, the values of the three independent variables discussed above determine the values of the following six dependent variables: (a) angular influence; (b) angular size of each lenticular lens; (c) minimum viewing radius; (d) size of virtual image; (e) vertical resolution of virtual image; and (f) horizontal resolution of virtual image.

Angular Influence: In some cases, if the angular influence per camera view is too small, then the virtual image generated will not take advantage of the full horizontal size, and if it is large, then the view will disappear off the radial mirror and not be visible to the user. In some cases: (a) the automultiscopic display is visible throughout an angular region of X degrees; and (b) the angular influence per camera view is equal to X degrees multiplied by the number of rendered views (of the 3D object) per lenticular lens divided by the total number of virtual camera angles. For example, if the automultiscopic display is viewable throughout 360 degrees and there are 20 virtual cameras and 5 views per lenticular, the angular influence for a particular view may be 360 degrees×5÷20 which would equal to 90 degrees angular influence.

Angular Size of Lens: In some cases: (a) the automultiscopic display of a 3D object is visible throughout an angular region of X degrees; and (b) the angular size of the lens is equal to X degrees divided by the number of cameras/views and by the number of times that each specific view sequence repeats. For example, if the display is visible throughout 360 degrees and there are 20 cameras and each specific view sequence is repeated 20 times, then the angular size of each lenticular lens may be 360 degrees÷(20×20) which equals 0.90 degrees.

Minimum Viewing Radius: The minimum viewing radius for a display screen is the radius at which there is one pixel of the display screen along the circumference of the radial array for every slice of every rendered view. In some cases, the minimum viewing radius is equal to the number of camera angles multiplied by the number of views per lenticular lens and by the number of times each specific view sequence repeats, and divided by $2\pi$. For example, in a system with 20 camera angles, 5 rendered views per lenticular lens, and 20 repeats for each view sequence, the minimum viewing radius is $20 \times 5 \times 20 \div (2\pi)$ which equals 318.3 pixels. Using the pixel pitch of the display screen, that value in pixels may be converted into other distance units.

Size and Resolution of Virtual Image: The horizontal resolution of the virtual image may increase as the distance from the center of the display or reflected image height increases, because of the wedge shape of each lenticular lens. There may be more available pixels at the edge of display screen as the wedge widens which results in a higher pixel resolution. The physical height of the virtual image may remain constant because of the anamorphic distortion applied to the camera/view. The resolution of the width of the virtual image may also be variable along the vertical axis. The minimum resolution (in pixels—pitch depending on monitor specifications) for the width of the virtual image may be calculated by multiplying the number of views per lenticular by the number of times that each specific view sequence repeats. That will return a pixel width which may then be converted (using the pixel pitch of the display screen) into the horizontal size of the virtual image.

In some implementations, if the number of cameras/views increases, all other variables being equal, then: (a) the horizontal and vertical resolution and size of the virtual image decrease; (b) the minimum viewing radius increases; (c) the angular extent of each individual view decreases; and (d) the angular size of each lenticular lens decreases.

In some implementations, if the number of views per lenticular lens increases, all other variables being equal, then: (a) the horizontal and vertical resolution and size of the virtual image decrease; (b) the minimum viewing radius will increase and the angular extent of each individual view increases; and (c) the angular size of each lenticular lens remains constant.

In some implementations, if the number of repetitions of each specific lenticular lens pattern increases, all other variables being equal, then: (a) the horizontal and vertical size of the virtual image generated increases; (b) the resolution of the image generated decreases; (c) the minimum viewing radius increases; (d) the angular extent of each individual view increases; and (e) the angular size of each lenticular lens increases.

In some cases, to render the 3D scene, virtual cameras are generated at different angular positions around the 3D scene. In software, the virtual camera's field of view may be adjusted to accommodate for the angular extent of the view on the display screen and the number of camera views being generated. Additionally, the radius of the camera ring may be variable. After virtually capturing the scene from each of the virtual camera's perspectives, the frames from each camera may be lenticularized in a shader onto a render texture. The height of the render texture may be equal to the maximum radius of the display (in pixels) that can generate a circle. The width of the render texture may be equal to the number of virtual cameras/views multiplied by the number of views per lenticular and the number of times that each specific view sequence. Next the render texture may be sent through a second shader process that radially distorts the image around the center of the monitor. This process may turn single pixel wide lines from the render texture into wedges that extend from the center of the monitor. As each wedge extends from the monitor, the number of pixels per wedge may increase. To avoid stretching and repeating pixels and to maximize the pixels that are sampled, this process may be streamlined to sample pixels based on the radially distorted location on the monitor.

Once the shader has been applied and rendered on the monitor, in order to see the images correctly, the radial lenticular may be precisely placed on the display screen. Light emitted by the display screen may refract through the lenticular lenses and then reflect off the radially symmetric mirror.

In some cases, the geometric shape of the radially symmetric mirror is a frustum of: (a) a cone; (b) a elliptic paraboloid; (c) sphere; (d) cylinder; or (e) any other object with at least one axis of rotational symmetry. The shader may be programmed to account for the shape's anamorphic distortion. The material of the mirror may be reflective or specular. For instance, the mirror may comprise mylar, acrylic, non-transparent reflective acrylic or a full mirror.

In some cases, the mirror is fully reflective. Alternatively, in some cases, the mirror comprises a beam splitter. The beam splitter may reflect a portion (e.g., 50%), and transmit a portion (e.g., 50%), of light incident upon the beam splitter. Thus, in some cases, a user simultaneously sees (a) a physical object that is actually located on the opposite side of the beam splitter; and (b) an illusion of a 3D object, which illusion is formed by one or more rendered views that reflect from the beam splitter. The displayed illusion of the 3D object may appear, to a user, to be superimposed on the actual physical object.

In some cases, the beam splitter comprises a half-silvered mirror (e.g., a sheet of plastic or glass, with an ultrathin coating of metal, such as aluminum). In some cases, the beam splitter comprises glass prisms that are attached to each other. In some cases, the beam splitter has a "swiss cheese" pattern. In some cases, the percentage of incident light that reflects from the beam splitter (rather than pass through it) depends on the angle and frequency of the incident light.

In some cases: (a) a radial array of lenticular lenses is employed; and (b) resolution is one over the number of views per each lenticular lens. In some cases: (a) there are six views per each lenticular lens; and (b) the maximum resolution of the automultiscopic image that reflects from the frustum is ⅕th of the display screen's resolution.

In some implementations of this invention: (a) light emitted by a display screen passes through a radial array of lenticular lenses, reflects from a frustum and thereby produces an automultiscopic, 360-degree display of a 3D object; (b) the number of virtual camera views is greater than or equal to 6 and less than or equal to 36; (c) the number of views of the 3D object that are displayed under each lenticular lens is greater than or equal to 4 and less than or equal to 10; and (c) the number of times that each specific view sequence repeats is greater than or equal to 6 and less than or equal to 36.

The preceding 22 paragraphs apply to a radial array of lenticular lenses. In addition, the preceding 22 paragraphs apply, mutatis mutandis, to a radial array of parallax barriers.

This invention is not limited to rendering and to virtual camera angles. In some cases: (a) one or more actual cameras capture photographic images of the 3D object from different actual camera angles; and (b) slices of the photographic images are processed (e.g., by anamorphic distortion) and displayed by the display screen.

Interactive Automultiscopic Display

In some implementations of this invention, a display device produces an interactive automultiscopic display that responds to input or feedback from one or more human users. The display device may employ sensors to detect a user's behavior (e.g., speech, facial affect, gestures and position relative to the display device) and may output an audiovisual 3D animated character that responds to the user's behavior.

Figure 6:
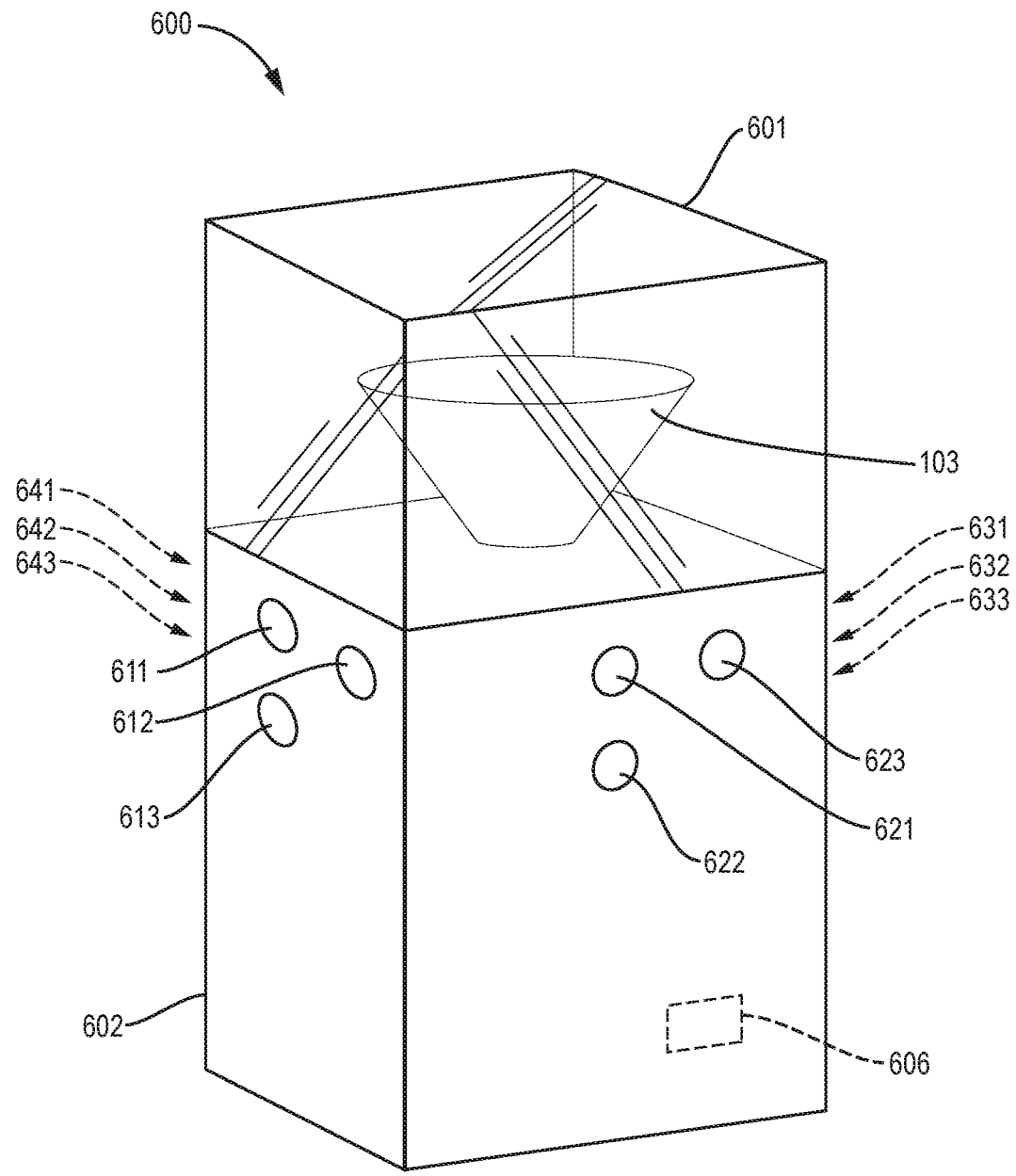
FIG. 6 shows hardware for generating an interactive automultiscopic display.

FIG. 6 shows hardware that is configured to present an interactive automultiscopic display, in an illustrative implementation of this invention. In FIG. 6, a mirrored frustum 103 of a cone reflects light from a display screen, in such a way that the reflected light creates a 360-degree automultiscopic display. The frustum 103 is enclosed by a transparent case 601 and rests on top of support structure 602. This support structure 602 causes frustum 103 to be at eye-level, for easier viewing by a human.

In FIG. 6, display device 600 interacts with human viewers. For instance, display device 600 may interact with a human user: (a) by recording images and sounds of the user; and (b) by producing audiovisual responses that are perceptible to the user. In FIG. 6, one or more computers (e.g., 606) control microphones 611, 621, 631, 641, speakers 612, 622, 632, 642 and cameras 613, 623, 633, 643. For instance, each of the cameras 613, 623, 633, 643 may be an Intel Realsense® camera that itself includes an RGB camera and a depth camera. In some cases, display device 600 also includes a set of LEDs (light emitting diodes) that provide signals to a human user, such as signals regarding whether the system has detected the user, whether the user appears to be engaging, and when the system is calculating a response to a user request.

Figure 7:
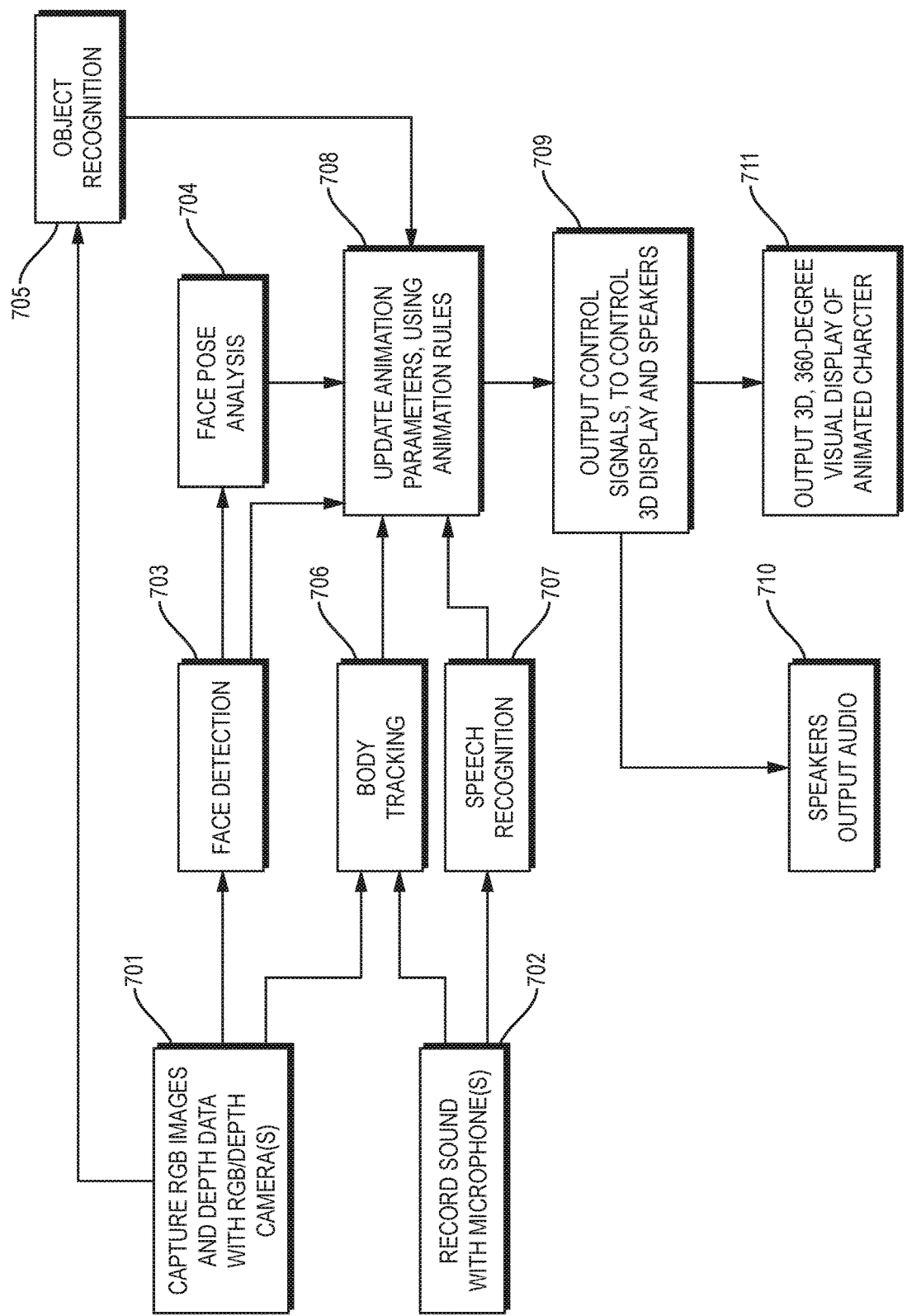
FIG. 7 is a flowchart of a method for producing an interactive automultiscopic display.

FIG. 7 is a flowchart of a method for an interactive 3D automultiscopic display, in an illustrative implementation of this invention. The method shown in FIG. 7 includes at least the following steps: Capture RGB images and depth data with RGB/depth camera(s) (Step 701). Based on the captured RGB images, perform face detection (Step 703), face pose analysis (Step 704), and object recognition (Step 705). Record sound with microphones (Step 702). Based on the recorded sound, perform speech recognition (Step 707.) Based on the recorded sounds and captured RGB images, perform body tracking (Step 706.) Then update animation parameters, using animation rules (Step 708). This update of animation parameters may be calculated based on one or more of: (a) face detection; (b) body tracking; (c) speech recognition, (d) object recognition and (e) face pose analysis. After the update, generate signals to control speakers and a 3D display (Step 709). For instance, the speakers may output audio (Step 710) and the system may output a 3D, 360-degree visual display of an animated character (Step 711).

In some implementations, a shader program (e.g., written in Unity® software) partitions the views based on: (a) the number of cameras in the scene, (b) the number of views per each lenticular lens, and (c) the number of times each specific view sequence repeats. Before the views are lenticularized the media from the virtual cameras may be rotated around the display to match where it will physically appear on the reflective cone. After the views have been rotated to the appropriate location, each of the camera's views may be sliced and reordered within the shader to produce the lenticularized result.

In some cases, an OpenCV program: (a) analyzes images captured by the RGB cameras to detect faces, body poses, and special objects in the scene; and (b) predicts the affective state of the user based on face pose analysis.

In some cases, the sensors include depth cameras that detect which users are closest to the device as well as their position relative to an animated character displayed in the automultiscopic display.

In some cases, the automultiscopic display shows an animated dog. The animated dog may be well-suited for expressing emotion because the head size is large relative to the body and the facial features of the character are contrasted. For instance, if the animated character is happy it may wag its tail and stick out its tongue, but if it is nervous or upset, it may put its head and ears down.

In some implementations, an animated character is rendered in the display volume. User interaction with the animated character may be facilitated by capturing images of the user with Intel Realsense® depth/RGB cameras. These cameras may be connected via USB to a computer which then streams depth and color data to Unity® software. The depth information streamed may allow the system to understand where users are in the space as well as body pose. The color information streamed may allow for body pose detection, object detection, face detection and recognition, and face pose detection. An omni-directional microphone may be connected to the computer and the audio may be streamed into Unity® software where it may be processed for volume and speech to text. Cloud voice analysis may be employed to interpret speech and assign responses. FFT (fast Fourier transform) may be applied to audio streaming directly in Unity® software which may be used to detect pitch and volume.

The Intel Realsense® data may be further processed and interpreted using software like Nuitrack™ to do skeleton tracking which exposes body pose and joint positions. This may enable the system to know when a user is close enough to the display or standing a particular place. Detecting body pose and joint tracking may be helpful for gesture tracking as well. Color data from the Intel Realsense Cameras® may be processed in OpenCV which has a Unity® SDK. With OpenCV, the color data may be analyzed for object detection, face detection and recognition and face pose analysis. This may allow the system to recognize objects, people and face pose (which may be used to interpret affective state). Face and gaze detection may be used (instead of trigger words like "OK Google" and "Alexa") as presumably users have intent to interact with the system if they're looking at the character/sensors.

Microphones may take sound recordings that are used to detect volume, pitch and speech. The speech may be analyzed using a cloud-based service, which then streams the input and a response back to Unity® software to influence how the character animates and responds. The speech analysis may be used to interpret special assigned words to trigger activities, games or special animations or content in the display. The response generated by the cloud-service may be used to animate the characters mouth if the character audibly responds to users.

The coupling of depth/RGB data and audio may allow for more nuanced understanding of a user's intent and affective state. In combination, this may be used to drive sympathetic animations from the character. Because the RGB data allows for face recognition, the system may store information about users to be retrieved whenever that user interacts with the system.

The animated character may be procedurally animated real-time in Unity® software based on the parameter analysis of the Intel Realsense® camera and microphone. In some cases: (a) the animated dog character does not look at multiple users at once; and (b) a LED strip is added along the circumference of the display to convey auxiliary information. For example, if the system detects a user, a colored area may appear on a LED strip that corresponds to the user's location. If the user is looking at the device, the color might change to reflect the active engagement. When the system is listening to the user and analyzing the user's speech, the width of the area may modulate to indicate that the system is engaged and interpreting. This color information may be streamed from Unity® software using serial messaging to an Arduino® board that is connected to the LEDs and the computer via USB.

In some cases, a context-aware infrastructure changes how the animated character responds depending on localized metadata curation.

Holographic Optical Element

The radial array 102 (of lenticular lenses or parallax barriers) may be replaced by a holographic optical element (HOE). The HOE may be a transmissive diffraction pattern that produces the same effect as a refractive optical element.

The HOE may be a thin flat piece of plastic or glass with a diffractive pattern on its surface or inside its volume, that simply replaces the lenticular on the surface of the display screen. The lenticular setup itself may be recorded into the HOE or the HOE may behave in more nuanced and specific ways than the lenticular. For instance, the viewing angle may be modified independently of the variables that constrain the lenticular design. The HOE may serve the same function as the radial lenticular or parallax barrier to angularly discretize the partitioned views on the monitor.

Software

In some cases, graphics for this display is created with Unity® software. Alternatively, the graphics may be created with Unreal® software or another custom graphics environment. To calibrate the radial lenticular with the monitor, a solid color may be assigned to each of the camera/views in the scene. During the calibration, the lenticular array may be considered aligned when only one view is visible at a time in at least one eye. In some cases: (a) a game engine may render the views, and (b) the views may be displayed in real-time. This, in turn, may allow users to readily change scenes and interact with the media being generated through sensor integrations such as depth cameras, RGB cameras, serial data, Bluetooth®, Wi-Fi®, and microphones.

In the Computer Program Listing above, nine computer program files are listed. These nine computer program files comprise software employed in a prototype implementation of this invention. In this prototype, the nine program files consisted of seven .cs files and two .shader files. However, in order to submit these nine programs to the U.S. Patent and Trademark Office, the nine program files were converted to ASCII .txt format, by making changes to the file extensions and text of the nine programs. In each of these nine programs, these changes may be reversed (so that the nine programs may be run as .cs files or .shader files). Specifically, these changes may be reversed by: (1) in the filename extension for each of the files, deleting ".txt" from each filename extension and then replacing each "_" with a ".", and (2) in the text of each of the files, replacing each "[[" with a "{" and replacing each "]]" with a "}". Reversing these changes (in the manner set forth in the preceding sentence) results in seven .cs files and two .shader files.

The seven .cs files were written in the C# programming language. Two of these .cs scripts (LightfieldGenerator.cs, ViewGenerator.cs) generate views and arrange the views on a render texture to be modified by the shaders. Three of these .cs scripts (ColorController.cs, RotationController.cs, SceneController.cs) control the scenes, such as by changing colors, changing scenes, or spinning objects. Two of these .cs scripts (RainbowDebugLenticular.cs, ViewingRadiusDebugger.cs) are debugging tools to validate the lenticular parameters The two .shader files were written in Unity® software. One of the shaders (ComputeLightField.shader) computes the light field rendering (lenticularizes the views). The other shader (ToPolarCoords.shader) warps the images to appear correctly in the radial mirror. These two shaders are implemented sequentially, in such a way that the polar warping stretches the sampled pixels. Alternatively, a shader script may sample new pixels at the warped position.

This invention is not limited to the software set forth in these nine computer program files. Other software may be employed. Depending on the particular implementation, the software used in this invention may vary.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, a display screen and one or more cameras, microphones, audio speakers, or light sources (e.g., LEDs); (2) to generate or render (or to control the capture of) views of a 3D object, where each view shows the 3D object from a different angle, (3) to create slices of the views; (4) to anamorphically distort the views or the slices; (5) to control the display of the slices by a display screen; (6) to control a display screen in such a way that light from the display screen creates (after interacting with one or more optical elements) an automultiscopic display; (7) to receive data from, control, or interface with one or more sensors; (8) to perform any other calculation, computation, program, algorithm, or computer function described or implied herein; (9) to receive signals indicative of human input; (10) to output signals for controlling transducers for outputting information in human perceivable format; (11) to process data, to perform computations, and to execute any algorithm or software; and (12) to control the read or write of data to and from memory devices (tasks 1-12 of this sentence referred to herein as the "Computer Tasks"). The one or more computers (e.g., 104) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Computer Readable Media

In some implementations, this invention comprises one or more computer that are programmed to perform one or more of the Computer Tasks.

In some implementations, this invention comprises one or more machine readable media, with instructions encoded thereon for one or more computers to perform one or more of the Computer Tasks.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, electronic devices (e.g., 101, 104) are each configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 104) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To say that a display is "automultiscopic" means that the display exhibits motion parallax in at least one dimension, which motion parallax is perceptible by unaided human vision. As a non-limiting example, in the preceding sentence, the dimension may be horizontal and the motion parallax may be horizontal motion parallax.

To compute "based on" specified data means to perform a computation that takes the specified data as an input.

Non-limiting examples of a "camera" include: (a) a digital camera; (b) a digital grayscale camera; (c) a digital color camera; (d) a video camera; (e) a light sensor, imaging sensor, or photodetector; (f) a set or array of light sensors, imaging sensors or photodetectors; (h) a light field camera or plenoptic camera; (i) a time-of-flight camera; and (j) a depth camera. In some cases, a camera includes any computers or circuits that process data captured by the camera.

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

"Electronic display screen" means a display screen that includes or is controlled at least in part by electronic components.

To say that an object is "elongated" means that an aspect ratio of the object is x:y, where x is at least 3 times greater than y.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say that each view in a set of views shows a 3D object "from a different angle" means that each view in the set shows the 3D object from an angle that is different than the angle from which the 3D object is shown in any other view in the set.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

"Horizontal diameter" means diameter in a horizontal plane.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Longitudinal axis" of an object means a straight line segment between two points of the object, which line segment has a length equal to the maximum dimension of the object.

As used herein, the "maximum dimension" of an object means the longest Euclidian distance between any two points of the object. For example, the maximum dimension of a circle is the diameter of the circle. Also, for example, if the sides of a square each have length A, then the maximum dimension of the square is $\sqrt{2}$A (the length of the diagonal between two opposite vertices of the square).

A fully reflective mirror is a non-limiting example of a "mirror". A beam splitter is a non-limiting example of a "mirror".

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

Unless the context clearly indicates otherwise, a "plane" means a geometric plane.

To say that X has an angular position of Y degrees "relative" to Z means that an angle of Y degrees exists, which angle is formed by a vertex, a first ray and a second ray, where (a) the vertex is Z; (b) the first ray is a straight geometric line that passes through X and the vertex; and (c) the second ray is a straight, geometric, reference line that passes through the vertex and has an angular position of zero degrees. As used herein, references to the angle of a first thing relative to a second thing, however worded, shall be construed in a manner consistent with this paragraph.

To "render" an image means to digitally synthesize the image (e.g., by performing a computer graphics program).

As used herein, the term "set" does not include a group with no elements.

"Slice" of a view means a portion of the view. Non-limiting examples of a slice of a view include: (a) a portion of a distorted version of the view; (b) a portion of an undistorted version of the view; (c) a distorted portion of the view; and (d) an undistorted portion of the view.

"Slit" of a parallax barrier means a hole in the barrier or a transparent region of the barrier.

Unless the context clearly indicates otherwise, "some" means one or more.

As used herein, a "subset" of a set consists of less than all of the elements of the set.

To say that two lines that lie entirely in the same plane are "substantially parallel" means that the two lines either: (a) are parallel; (b) are co-located at all points of the two lines; or (c) form an angle that is less than or equal to 10 degrees.

The term "such as" means for example.

To say that a machine-readable medium is "transitory" means that the medium is a transitory signal, such as an electromagnetic wave.

"3D" means three-dimensional.

"2D" means two-dimensional.

To say that a slice is "under" a lenticular lens means that the slice is positioned in such a way that light from the slice passes through the lenticular lens. To say that a slice is "under" a slit means that the slice is positioned in such a way that light from the slice passes through the slit. To say that a rendered view is "under" a lenticular lens means that the rendered view is positioned in such a way that light from the rendered view passes through the lenticular lens. To say that a rendered view is "under" a slit means that the rendered view is positioned in such a way that light from the rendered view passes through the slit. To say that a screen is "under" a radial array of lenticular lens means that the screen is positioned in such a way that light from the screen passes through the radial array. To say that a screen is "under" a radial array of parallax barriers means that the screen is positioned in such a way that light from the screen passes through the radial array.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method for creating an automultiscopic display of a 3D object, which method comprises the steps of: (a) displaying, with an electronic display screen that is positioned under a radial array of lenticular lenses, a set of multiple views of the 3D object, in such way that (i) each view in the set shows the 3D object from a different angle, (ii) for each specific view in the set, the screen displays multiple slices of the specific view, in such a way that each slice of the specific view (A) is different than each other slice of the specific view and (B) is displayed under a different lenticular lens in the radial array than that under which any other slice of the specific view is displayed, and (iii) under each lenticular lens in the radial array, the screen displays slices of more than one but not all of the views in the set; and (b) refracting and reflecting light from the display screen in such a way that the light travels through, and is refracted by, the radial array, and then reflects from a radially symmetric mirror to create the automultiscopic display of the 3D object. In some cases, each particular lenticular lens in the radial array has a constant focal length at all points along a longitudinal axis of the particular lens. In some cases: (a) the radial array has a periphery; and (b) for each particular lenticular lens in the radial array, width and height of the particular lens each increase as distance to the periphery decreases. In some cases, the automultiscopic display is viewable throughout an angular region of 360 degrees around the display. In some cases, the automultiscopic display is viewable throughout an angular region of at least 270 degrees around the display. In some cases, the mirror comprises a beam splitter. In some cases, the mirror has the geometric shape that is a frustum of a cone or of another radially symmetric shape. In some cases, horizontal diameter of the mirror increases as distance from the radial array increases. In some cases, the refracting is performed in such a way that which slice, out of the slices displayed under a specific lens in the radial array, is visible through the specific lens from a vantage point depends on horizontal angular position of the vantage point relative to the specific lens. In some cases, the method includes distorting each specific slice of each view in the set, in such a way that the distorting causes the specific slice to be wedge-shaped. In some cases, the method further comprises: (a) gathering sensor data regarding behavior of human users; and (b) modifying the automultiscopic display in response to the behavior. Each of the cases described above in this paragraph is an example of the method described in the first sentence of this paragraph, and is also an example of an embodiment of this invention that may be combined with other embodiments of this invention.

In some implementations, this invention is an apparatus comprising: (a) an electronic display screen; (b) a radial array of lenticular lenses; (c) a radially symmetric mirror; and (d) one or more computers; wherein (i) the one or more computers are programmed to cause the display screen to display a set of multiple views of a 3D object, in such way that (A) each view in the set shows the 3D object from a different angle, (B) for each specific view in the set, the screen displays multiple slices of the specific view, in such a way that each slice of the specific view (A) is different than each other slice of the specific view and (B) is displayed under a different lenticular lens in the radial array than that under which any other slice of the specific view is displayed, and (C) under each lenticular lens in the radial array, the screen displays slices of more than one but not all of the views in the set, and (ii) the mirror and radial array of lenticular lenses are configured in such a way that, when the display screen displays the set of multiple views, light from the display screen travels through, and is refracted by, the radial array, and then reflects from a radially symmetric mirror to create an automultiscopic display of the 3D object. In some cases, each particular lenticular lens in the radial array has a focal plane that is constant at all points along a longitudinal axis of the particular lens. In some cases: (a) the radial array has a periphery; and (b) for each particular lenticular lens in the radial array, width and height of the particular lens each increase as distance to the periphery decreases. In some cases, the automultiscopic display is viewable throughout an angular region of 360 degrees around the display. In some cases, the automultiscopic display is viewable throughout an angular region of at least 270 degrees around the display. In some cases, the mirror comprises a beam splitter. In some cases, the mirror has the geometric shape that is a frustum of a cone or of another radially symmetric shape. In some cases, horizontal diameter of the mirror increases as distance from the radial array increases. In some cases, each slice of each view in the set is wedge-shaped and is a distortion of a rectangular slice of the view. In some cases: (a) the apparatus further includes one or more microphones and one or more cameras; and (b) the one or more computers are programmed (i) to analyze audio data captured by the one or more microphones and visual data captured by the one or more cameras, which audio data contains information regarding speech by one or more humans and which visual data includes images of the one or more humans, and (ii) based on the audio data and the visual data, to cause the display screen to change the 3D object shown in the automultiscopic display. Each of the cases described above in this paragraph is an example of the apparatus described in the first sentence of this paragraph, and is also an example of an embodiment of this invention that may be combined with other embodiments of this invention.

In some implementations, this invention is an apparatus comprising: (a) an electronic display screen; (b) a holographic optical element; and (c) a radially symmetric mirror; wherein the mirror and the holographic optical element are configured in such a way that, when the display screen emits light, the light travels through the holographic optical element, and then reflects from a radially symmetric mirror to create an automultiscopic display that is viewable throughout an angular region of 360 degrees around the mirror. In some cases, the mirror comprises a beam splitter. Each of the cases described above in this paragraph is an example of the apparatus described in the first sentence of this paragraph, and is also an example of an embodiment of this invention that may be combined with other embodiments of this invention.

In some implementations, this invention is a method for creating an automultiscopic display of a 3D object, which method comprises the steps of: (a) displaying, with an electronic display screen that is positioned under a radial array of parallax barriers, a set of multiple views of the 3D object, in such way that (i) each view in the set shows the 3D object from a different angle, (ii) for each specific view in the set, the screen displays multiple slices of the specific view, in such a way that each slice of the specific view (A) is different than each other slice of the specific view and (B) is displayed under a different slit of the radial array than that under which any other slice of the specific view is displayed, and (iii) under each slit in the array, the screen displays slices of more than one but not all of the views in the set; and (b) interacting with light from the display screen in such a way that (A) a first portion of the light is occluded by the radial array and (B) a second portion of the light travels through the radial array and then reflects from a radially symmetric mirror to create the automultiscopic display of the 3D object. In some cases: (a) the radial array has a periphery; and (b) for each particular slit in the radial array, width of the slit increases as distance to the periphery decreases. In some cases, the automultiscopic display is viewable throughout an angular region of 360 degrees around the display. In some cases, the automultiscopic display is viewable throughout an angular region of at least 270 degrees around the display. In some cases, the mirror comprises a beam splitter. In some cases, the mirror has the geometric shape that is a frustum of a cone or of another radially symmetric shape. In some cases, horizontal diameter of the mirror increases as distance from the radial array increases. In some cases, the interacting is performed in such a way that which slice, out of the slices displayed under a specific slit in the radial array, is visible through the specific slit from a vantage point depends on horizontal angular position of the vantage point relative to the specific slit. In some cases, the method includes distorting each specific slice of each view in the set, in such a way that the distorting causes the specific slice to be wedge-shaped. In some cases, the method further comprises: (a) gathering sensor data regarding behavior of human users; and (b) modifying the automultiscopic display in response to the behavior. Each of the cases described above in this paragraph is an example of the method described in the first sentence of this paragraph, and is also an example of an embodiment of this invention that may be combined with other embodiments of this invention.

In some implementations, this invention is an apparatus comprising: (a) an electronic display screen; (b) a radial array of parallax barriers; (c) a radially symmetric mirror; and (d) one or more computers; wherein (i) the one or more computers are programmed to cause the display screen to display a set of multiple views of a 3D object, in such way that (A) each view in the set shows the 3D object from a different angle, (B) for each specific view in the set, the screen displays multiple slices of the specific view, in such a way that each slice of the specific view (A) is different than each other slice of the specific view and (B) is displayed under a different slit in the radial array than that under which any other slice of the specific view is displayed, and (C) under each slit in the radial array, the screen displays slices of more than one but not all of the views in the set, and (ii) the mirror and radial array are configured to interact with light from the display screen in such a way that, when the display screen displays the set of multiple views (A) a first portion of the light is occluded by the radial array and (B) a second portion of the light travels through the radial array and then reflects from a radially symmetric mirror to create an automultiscopic display of the 3D object. In some cases: (a) the radial array has a periphery; and (b) for each slit in the radial array, width of the particular slit increases as distance to the periphery decreases. In some cases, the automultiscopic display is viewable throughout an angular region of 360 degrees around the display. In some cases, the automultiscopic display is viewable throughout an angular region of at least 270 degrees around the display. In some cases, the mirror comprises a beam splitter. In some cases, the mirror has the geometric shape that is a frustum of a cone or of another radially symmetric shape. The method of claim 1, wherein horizontal diameter of the mirror increases as distance from the radial array increases. In some cases, each slice of each view in the set is wedge-shaped and is a distortion of a rectangular slice of the view. In some cases: (a) the apparatus further includes one or more microphones and one or more cameras; and (b) the one or more computers are programmed (i) to analyze audio data captured by the one or more microphones and visual data captured by the one or more cameras, which audio data contains information regarding speech by one or more humans and which visual data includes images of the one or more humans, and (ii) based on the audio data and the visual data, to cause the display screen to change the 3D object shown in the automultiscopic display. Each of the cases described above in this paragraph is an example of the apparatus described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein.

What is claimed:

1. A method for creating an automultiscopic display of a 3D object, which method comprises the steps of:
   (a) displaying, with an electronic display screen that is positioned under a radial array of lenticular lenses, a set of multiple views of the 3D object, in such way that
      (i) each view in the set shows the 3D object from a different angle,
      (ii) for each specific view in the set, the screen displays multiple slices of the specific view, in such a way that each slice of the specific view (A) is different than each other slice of the specific view and (B) is displayed under a different lenticular lens in the radial array than that under which any other slice of the specific view is displayed, and
      (iii) under each lenticular lens in the radial array, the screen displays slices of more than one but not all of the views in the set; and
   (b) refracting and reflecting light from the display screen in such a way that the light travels through, and is refracted by, the radial array, and then reflects from a radially symmetric mirror to create the automultiscopic display of the 3D object.

2. The method of claim 1, wherein each particular lenticular lens in the radial array has a constant focal length at all points along a longitudinal axis of the particular lens.

3. The method of claim 1, wherein:
(a) the radial array has a periphery; and
(b) for each particular lenticular lens in the radial array, width and height of the particular lens each increase as distance to the periphery decreases.

4. The method of claim 1, wherein the automultiscopic display is viewable throughout an angular region of 360 degrees around the display.

5. The method of claim 1, wherein the mirror comprises a beam splitter.

6. The method of claim 1, wherein the mirror has the geometric shape that is a frustum of a cone or of another radially symmetric shape.

7. The method of claim 1, wherein horizontal diameter of the mirror increases as distance from the radial array increases.

8. The method of claim 1 wherein the refracting is performed in such a way that which slice, out of the slices displayed under a specific lens in the radial array, is visible through the specific lens from a vantage point depends on horizontal angular position of the vantage point relative to the specific lens.

9. The method of claim 1, wherein the method includes distorting each specific slice of each view in the set, in such a way that the distorting causes the specific slice to be wedge-shaped.

10. The method of claim 1, wherein the method further comprises:
(a) gathering sensor data regarding behavior of human users; and
(b) modifying the automultiscopic display in response to the behavior.

11. An apparatus comprising:
(a) an electronic display screen;
(b) a radial array of lenticular lenses;
(c) a radially symmetric mirror; and
(d) one or more computers;
wherein
(i) the one or more computers are programmed to cause the display screen to display a set of multiple views of a 3D object, in such way that
(A) each view in the set shows the 3D object from a different angle,
(B) for each specific view in the set, the screen displays multiple slices of the specific view, in such a way that each slice of the specific view (A) is different than each other slice of the specific view and (B) is displayed under a different lenticular lens in the radial array than that under which any other slice of the specific view is displayed, and
(C) under each lenticular lens in the radial array, the screen displays slices of more than one but not all of the views in the set, and
(ii) the mirror and radial array of lenticular lenses are configured in such a way that, when the display screen displays the set of multiple views, light from the display screen travels through, and is refracted by, the radial array, and then reflects from the radially symmetric mirror to create an automultiscopic display of the 3D object.

12. The apparatus of claim 11, wherein each particular lenticular lens in the radial array has a focal plane that is constant at all points along a longitudinal axis of the particular lens.

13. The apparatus of claim 11, wherein:
(a) the radial array has a periphery; and
(b) for each particular lenticular lens in the radial array, width and height of the particular lens each increase as distance to the periphery decreases.

14. The apparatus of claim 11, wherein the automultiscopic display is viewable throughout an angular region of 360 degrees around the display.

15. The apparatus of claim 11, wherein the mirror comprises a beam splitter.

16. The apparatus of claim 11, wherein the mirror has the geometric shape that is a frustum of a cone or of another radially symmetric shape.

17. The method of claim 1, wherein horizontal diameter of the mirror increases as distance from the radial array increases.

18. The apparatus of claim 11, wherein each slice of each view in the set is wedge-shaped and is a distortion of a rectangular slice of the view.

19. The apparatus of claim 11, wherein:
(a) the apparatus further includes one or more microphones and one or more cameras; and
(b) the one or more computers are programmed
(i) to analyze audio data captured by the one or more microphones and visual data captured by the one or more cameras, which audio data contains information regarding speech by one or more humans and which visual data includes images of the one or more humans, and
(ii) based on the audio data and the visual data, to cause the display screen to change the 3D object shown in the automultiscopic display.

* * * * *